(12) United States Patent  (10) Patent No.: US 7,148,913 B2
Keaton et al.  (45) Date of Patent: Dec. 12, 2006

(54) VISION-BASED POINTER TRACKING AND OBJECT CLASSIFICATION METHOD AND APPARATUS

(75) Inventors: Patricia Trish Keaton, Woodland Hills, CA (US); Sylvia Dominguez, Oxnard, CA (US); Ali H. Sayed, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 818 days.

(21) Appl. No.: 10/269,797

(22) Filed: Oct. 12, 2002

(65) Prior Publication Data

US 2003/0095140 A1 May 22, 2003

Related U.S. Application Data

(60) Provisional application No. 60/329,387, filed on Oct. 12, 2001, provisional application No. 60/329,386, filed on Oct. 12, 2001.

(51) Int. Cl.
*H04N 5/225* (2006.01)
*G06F 3/033* (2006.01)

(52) U.S. Cl. .................................... 348/169
(58) Field of Classification Search ............... None
See application file for complete search history.

(56) References Cited

U.S. PATENT DOCUMENTS 5,323,470 A * 6/1994 Kara et al. ............... 382/103
5,423,554 A 6/1995 Davis
2004/0034556 A1* 2/2004 Matheson et al. ............. 705/8

OTHER PUBLICATIONS

T. Kailath, A.H. Sayed and B. Hassibi, "Linear Estimation," Prentice Hall, NJ, 2000, pp. 310-333.

C. Jennings, "Robust finger tracking with multiple cameras," Rec., Anal., and Track. of Faces and Gestures in Real-Time Sys., 1999, Proc. Int'l Works. on Corfu, Greece Sep. 26-27, 1999, Los Alamitos, CA, USA, IEEE Comput. Soc., pp. 152-160, XP010356542.

K. Mohan Malladi, et al., "Gauss-Markov model formulation for the estimation of time-varying signals and systems," TENCON '98, 1998, IEEE Region 10 Int'l Conf. on Glob. Con. in Ene., Comp., Com. and Cont. New Delhi, India Dec. 17-19, 1998, JN, USA, IEEE, US, pp. 166-169, XP010355488.

Irene Yu-Hua Gu, et al., "Colour image segmentation using adaptive mean shift filters," Proc. 2001 Int'l Conf. on Image Processing, ICIP 2001, New York, NY: IEEE, US, vol. 1 of 3, Conf. 8, Oct. 7, 2001, pp. 726-729, XP010564962.

A.H. Sayed, "A framework for state-space estimation with uncertain models," IEEE Transactions on Automatic Control, vol. 46, No. 9, Sep. 2001.

(Continued)

*Primary Examiner*—Nhon Diep
(74) *Attorney, Agent, or Firm*—TopeMcKay&Associates

(57) ABSTRACT

A vision-based pointer tracking and object recognizing system is presented. The system comprises a computer system including a processor, a memory coupled with the processor, an input coupled with the processor for receiving a series of image frames from a camera, and an output coupled with the processor for outputting a path of a pointer. The computer system includes a tracking system and a recognition system which are configured to accurately and efficiently track the fingertip of a user in order to allow the user to perform coarse segmentation of an object in preparation for object classification. The tracking system includes a Robust Tracking Filter that accommodates uncertainties. The object recognition system incorporates an invariant object recognition technique that allows objects to be recognized despite changes in user viewpoint.

174 Claims, 10 Drawing Sheets

OTHER PUBLICATIONS

T. Brown and R.C. Thomas, "Finger tracking for the Digital Desk," Australasian User Interface Conference (AUIC), vol. 1, pp. 11-16, Australia, 1999.

A. Wu M Shah, and N. Da Vitoria Lobo, "A virtual 3D blackboard: 3D finger tracking using a single camera," Proceedings, Fourth IEEE Int'l Conf. on Automatic Face and Gesture Recognition, pp. 536-543,, 2000.

* cited by examiner

VISION-BASED POINTER TRACKING AND OBJECT CLASSIFICATION METHOD AND APPARATUS

PRIORITY CLAIM

This application claims the benefit of priority to provisional application No. 60/329,387, filed in the United States on Oct. 12, 2001, and titled "SNAP & TELL: A Vision-Based Wearable System to Support 'Web-on-the-World' Applications"; and to provisional application No. 60/329,386, filed in the United States on Oct. 12, 2001, and titled "Robust Finger Tracking for Wearable Computer Interfacing".

BACKGROUND

(1) Technical Field

The present invention relates to the fields of adaptive filtering, computer vision, and object recognition, and more particularly to the field of wearable computer systems that identify and provide information regarding objects in an environment.

(2) Discussion

Computing technology has an ever-increasing impact on our daily lives. One recent computing trend is mobile, wearable, computing for the design of intelligent assistants to provide location-aware information access which can help users more efficiently accomplish their tasks. Thus, in the future, a user driving by a hotel or a restaurant may be able to access information such as recommendations by other visitors, the restaurant menu, and hours of operation simply by pointing their finger at the establishment. However, several technical issues must be solved before this is possible. Computer systems currently available suffer from an inability to deal with environmental uncertainties because the computational requirement for dealing with uncertainty is generally very high.

Currently, the dominant approach to problems associated with systems such as those mentioned above is through the use of computer vision algorithms. In the past, the applicability of computer vision algorithms aimed at real-time pattern recognition and object tracking has been hindered by excessive memory requirements and slow computational speeds. Recent computer vision approaches for tracking applications have reduced the necessary computation time by reducing the image search area to a smaller window. The constrained area is then centered around the last known position of the moving object being tracked. The main drawback of these methods is that when the object being tracked moves faster than the frame capture rate of the system, the object moves out of the window range. This possibility leads to a loss in tracking ability and forces the system to reset the image search area to the full view of the camera in order to recover the position of the object. The repeated reduction and expansion of the image search area slows the system's performance considerably.

Some tracking solutions have attempted to overcome these problems by gradually varying the search window's size according to the moving object's speed. The faster the object moves, the larger the search window becomes, while still centering on the last known position of the object. Therefore, if the object is moving rapidly, the search window becomes large and the computation time for the system increases, thus slowing down the system's response time.

More advanced systems such as that discussed in "Robust Finger Tracking with Multiple Cameras", Proc. Conference on Recognition, Analysis, and Tracking of Faces and Gestures in Real-Time Systems, Corfu, Greece, 1999, pp. 152–160 by C. Jennings, use state-space estimation techniques to center a smaller search window around a predicted position of an object, rather than around its current position. In this way, as the moving object's speed increases, the predicted window position accompanies the object, thereby keeping it inside the window's view. The window size thus remains small and centered around the object of interest regardless of its speed. This, in turn, keeps the memory allocations to a minimum, freeing memory space that can be used by other simultaneous applications. However, abrupt changes in the object's movement patterns introduces modeling uncertainties, and such systems break down, resulting in loss of the tracked object.

The state-space solutions presented to-date are generally prone to failure when uncertainties are introduced by the surrounding environment or through the ego-motion of the user. It is well known that a central premise in Kalman filtering is its assumption that the underlying model parameters $\{F, G, H, R, Q\}$ are accurate. Once this assumption is violated, the performance of the filter deteriorates appreciably.

Therefore, a robust estimation technique is needed that models uncertainties created by the environment and the user's random ego-motion in the state-space model, and which is effective in keeping the object inside a small search window, thereby reducing the number of times the image search area has to be expanded to full view; thus improving the system's response time. Furthermore, in order to provide information regarding objects or places in a scene, it is desirable that an estimation technique, a robust technique, be combined into a vision-based pointer tracking system that incorporates object recognition so that information associated with recognized objects can be presented to a user.

The following references are presented for further background information:

[1] T. Kailath, A. H. Sayed, and B. Hassibi, *Linear Estimation*, Prentice Hall, NJ, 2000.

[2] A. H. Sayed, "A framework for state-space estimation with uncertain models", *IEEE Transactions on Automatic Control*, vol. 46, no. 9, September 2001.

[3] T. Brown and R. C. Thomas, "Finger tracking for the Digital Desk", *Australasian User Interface Conference (AUIC)*, vol. 1, pp. 11–16, Australia, 2000.

[4] A. Wu, M. Shah, and N. Da Vitoria Lobo, "A virtual 3D blackboard: 3D finger tracking using a single camera", *Proceedings. Fourth IEEE International Conference on Automatic Face and Gesture Recognition*, pp. 536–543, 2000.

[5] D. Comaniciu and P. Meer, "Robust analysis of feature space: color image segmentation", *Proc. Conference on Computer Vision and Pattern Recognition*, San Juan, Puerto Rico, 1997, pp. 750–755.

[6] V. Colin de Verdiere, and J. L. Crowley, "Visual recognition using local appearance", *Proc. European Conference on Computer Vision*, Frieburg, Germany, 1998.

[7] S. M. Dominguez, T. A. Keaton, A. H. Sayed, "Robust finger tracking for wearable computer interfacing", *Proc. Perceptive User Interfaces*, Orlando, Fla., November 2001.

[8] T. Keaton, and R. Goodman, "A compression framework for content analysis", *Proc. Workshop on Content-based Access of Image and Video Libraries*, Fort Collins, Colo., June 1999, pp. 68–73.

[9] H. Schneiderman, and T. Kanade, "Probabilistic modeling of local appearance and spatial relationships for object recognition", *Proc. Conference on Computer Vision and Pattern Recognition,* Santa Barbara, Calif., 1998, pp. 45–51.

[10] C. Tomasi and T. Kanade, "Detection and tracking of point features", Technical Report CMU-CS-91-132, Carnegie Mellon University, Pittsburg, Pa., April 1991.

[11] J. Yang, W. Yang, M. Denecke, A. Waibel, "Smart sight: a tourist assistant system", *Proc. Intl. Symposium on Wearable Computers,* vol. 1, October 1999, pp.73–78.

[12] R. K. Mehra, "On the identification of variances and adaptive Kalman filtering", *IEEE Transactions on Automatic Control,* AC-15, pp. 175–183, 1970.

SUMMARY

The present invention presents a vision-based pointer tracking system comprising: a computer system including a processor and a memory coupled with the processor. The computer system further comprises an input coupled with the processor for receiving a series of image frames from a camera, and an output coupled with the processor for outputting a path of a pointer, the computer system further comprising means, residing in its processor and memory for: searching a search window within the frame for a portion of the window indicative of a pointer; recognizing the pointer; determining the position and trajectory of the pointer; robustly predicting the position of the pointer in the next image frame in the series of image frames; adjusting the search window within the next image frame such that the search window comprises a subset of the next image frame positioned so that the actual position of the pointer is likely to be within the search window in the next image frame; tracking the path of the pointer through an area represented by the series of image frames; and outputting the path of the pointer, whereby the means for robustly predicting the position of the pointer, combined with the adjusted search window enables the system to track the path of a pointer in a computationally efficient manner.

In a further embodiment, the means for recognizing the pointer is a combination color segmenter and shape identifier, whereby the color segmenter operates on the search window to determine the presence of pointer candidates, and the shape identifier filters the pointer candidates to recognize the pointer within the search window. The means for recognizing the pointer is tailored for recognizing a finger of a user, so that the color segmenter operates on the search window to find finger-colored portions of the search window, and the shape identifier filters the finger-colored portions of the search window in order to find the finger. The color segmenter is further selected from the group consisting of a mean shift theorem algorithm used to adaptively quantize a color space to reduce the number of colors; a Gaussian mixture modeling algorithm; a thresholding algorithm used to limit the number of colors to a set designated apriori; and a Markov-random field algorithm.

The means for robustly predicting the position of the pointer can be an algorithm selected from the group consisting of Kalman filters, Extended Kalman filters, and Particle filters. This algorithm is typically adapted to accommodate uncertainty, and is thus, a Robust Tracking Filter.

In another embodiment of the present invention, the means for adjusting the search window within the next frame centers a search window of predetermined size on the predicted position of the pointer. The size of the search window is determined as a function of the uncertainty in the motion of the pointer. Both the size and the shape of the search window may be adjusted based on historical pointer movements. When a pointer is not recognized in the search window, the search window is redefined to encompass the entire image frame so that recognition may be attempted again in a larger area.

In a further embodiment, the vision-based pointer tracker of the present invention is configured so that the output provides the path of the pointer to an object recognizer system residing in the processor and memory. The object recognizer comprises means for segmenting an object indicated by the path of the pointer and recognizing the object, whereby the pointer may be used to indicate an area in which an object to be recognized resides, and the system can then segment and recognize the object from a scene. The means for recognizing the object generally comprises means for extracting features from the segmented object and classifying the object based on the extracted features to generate an object classification.

In yet another embodiment, the output of the system is configured to output the object classification. The output may be is connected with a database system, such that the object classification is communicated with the database system, and the input may be connected with the database system to receive supplementary information regarding the classified object; whereby once an object is classified, information regarding its classification is sent to a database in order to retrieve stored information regarding the object.

In a still further embodiment, the output of the system is configured to provide the user with at least one type of feedback selected from the group consisting of audio feedback, visual feedback, and kinesthetic feedback based on the path of the pointer, so that the system can indicate when a path is completed for the recognition process to begin. The output can also be configured to provide the user with at least one type of feedback selected from the group consisting of audio feedback, visual feedback, and kinesthetic feedback based on the classification of the object.

The database may be remote from the system, or the system may further comprise a database, and wherein the classification of the object is communicated with the database and the database, in turn, recalls supplementary information regarding the object.

In still another embodiment, the means for extracting features from the segmented object is selected from a group consisting of a combination of factor analyzing algorithms and an EM algorithm, a color histogram matching algorithm, a wavelet algorithm, a DCT coefficient algorithm, a texture-based algorithm, and an edge-based algorithm; and the means for classifying the object based on the extracted features is selected from a group consisting of a K-nearest neighbor algorithm, a neural network, and a support vector machine.

The features of the above embodiments may be combined in many ways to produce a great variety of specific embodiments, as will be appreciated by those skilled in the art. Furthermore, the means which comprise the apparatus are analogous to the means present in computer program product embodiments and to the steps in the method embodiment.

BRIEF DESCRIPTION OF THE DRAWINGS

The objects, features and advantages of the present invention will be apparent from the following detailed descriptions of the preferred embodiment of the invention in conjunction with reference to the following drawings where:

FIG. 8(a) to FIG. 8(d) depict the error in the estimates in the x and y position components and in the x and y velocity components, respectively;

DETAILED DESCRIPTION

Figure 1:
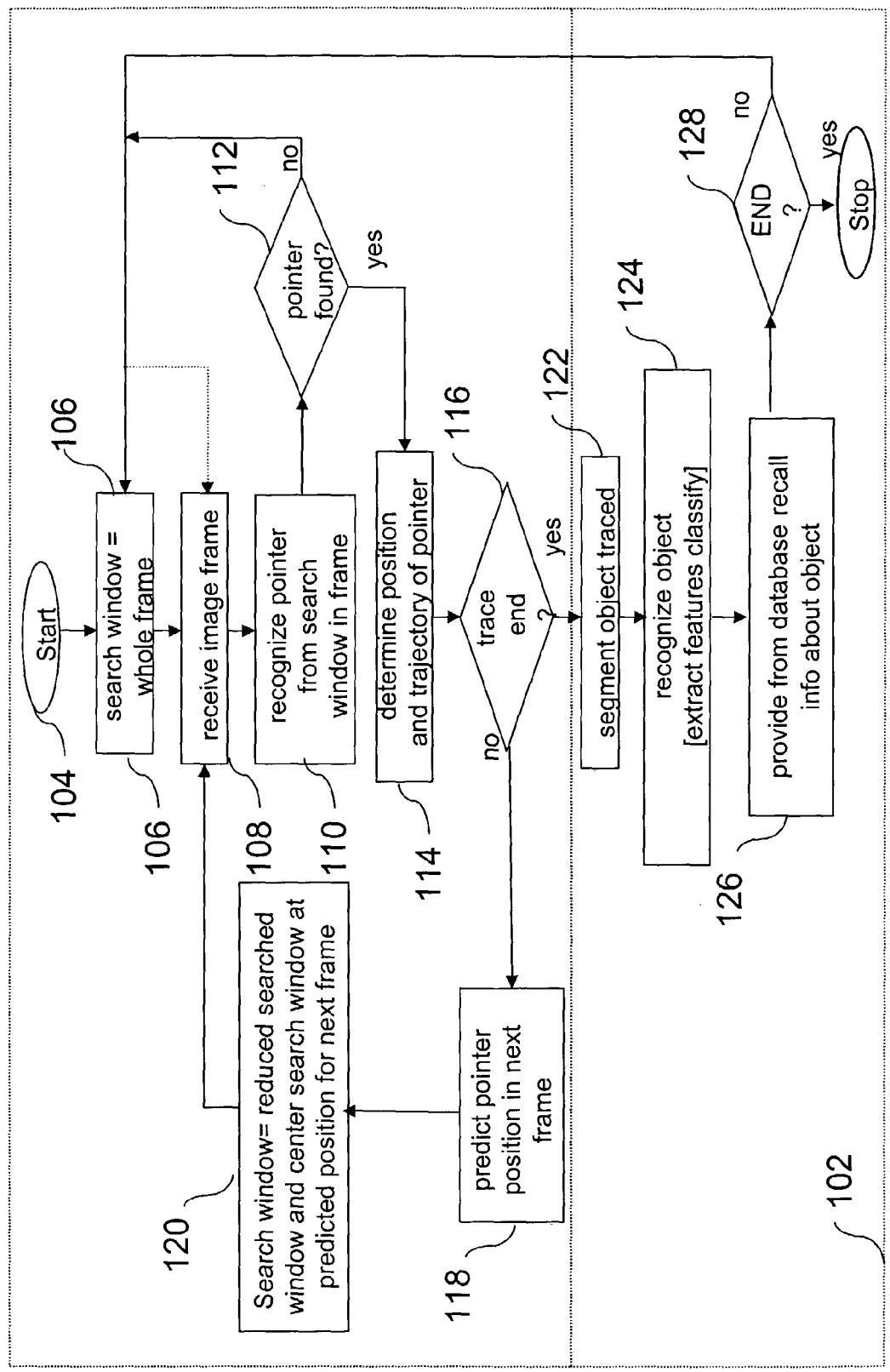
FIG. 1 is a flow chart depicting the operating steps/means/modules of the present invention.

The present invention relates to the fields of adaptive filtering, computer vision, and object recognition, and more particularly to the field of wearable computer systems that identify and provide information regarding objects in an environment. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In order to provide a working frame of reference, first a glossary of some of the terms used in the description and claims is given as a central resource for the reader. The glossary is intended to provide the reader with a "feel" for various terms as they are used in this disclosure, but is not intended to limit the scope of these terms. Rather, the scope of the terms is intended to be construed with reference to this disclosure as a whole and with respect to the claims below. Then, a brief introduction is provided in the form of a narrative description of the present invention to give a conceptual understanding prior to developing the specific details.

(1) Glossary

Before describing the specific details of the present invention, it is useful to provide a centralized location for various terms used herein and in the claims. The terms defined are as follows:

Camera—The camera used in most cases for capturing images for use with the present invention is a pencil-type camera operating in the visible light spectrum. However, other imaging cameras may be used that operate in other areas of the spectrum. Furthermore, the present invention may applied not only with monocular camera systems, but also to binocular camera systems as well as those capable of capturing more than two simultaneous images from different perspectives.

Ego-Motion—This term is used herein to indicate motion of the user (self-motion), whether conscious or involuntary.

Means—The term "means" when used as a noun with respect to this invention generally indicates a set of operations to be performed on a computer, and may represent pieces of a whole program or individual, separable, software (or hardware) modules. Non-limiting examples of "means" include computer program code (source or object code) and "hard-coded" electronics. The "means" may be stored in the memory of a computer or on a computer readable medium. In some cases, however, the term "means" refers to a class of device used to perform an operation.

Pointer—The term "pointer", as used herein generally indicates a device used by a user to indicate a point or region of interest in a scene. For example, the pointer may be an object such as a wand, or it could be a specially designed pointing stick fabricated in a manner to enable easy segmentation (e.g. colored such that it is easy to segment and shaped so that the portion used for pointing is easily identifiable). However, pointer may simply be a finger or hand of a user, with the color of the skin and shape of the finger or hand being used for recognition purposes.

Robust—The term "robust", as used herein indicates that the system is tolerant to uncertainties such as those associated with the movement of the pointer, the camera, the object of interest, and changes in the environment (e.g. lighting changes, movement of the background, etc.). Robustness is important for the prediction of the pointer's position in the next image frame so that the search window within the image can be minimized. The more robust, or accurate in the face of uncertainty, the system is, the smaller the necessary search window for finding the pointer's next position, and the lower the computational requirements of the system. Thus, a robust system enables tracing the motion of the pointer with far less computation than a non-robust system.

(2) Overview

The present invention, in a preferred embodiment, provides a vision-based wearable computer system that provides human-computer interfacing for recognizing and displaying information concerning objects in a scene. The system includes a vision-based pointer tracking system designed to track a pointer, for example a naked human finger, in a predictive manner that takes into account motion-related uncertainties (typically such as those associated with gesture tracking from head-mounted cameras). The segmentation is based on skin color detection, using a mean shift algorithm to deal with dynamically changing color distributions and shape analysis to identify the fingertip. This tracking system enables recording of the path taken by a pointer as it moves thorough the visual scene in order to allow a user to coarsely "segment" (i.e. select) objects of interest.

In addition to the tracking of the pointer's path, the system also includes an object recognizer designed to recognize an object selected by the user. The object is selected through feature extraction and classification. Once the object has been classified, supplemental information may be presented to the user regarding the object. For example, a user in a museum may desire information regarding a particular artifact. The user may circle the artifact with their finger, with the path of their finger being tracked by the system. After the artifact is circled, features of the portion of the scene circled are extracted and the artifact is recognized. After the artifact has been recognized (from a database of artifacts), the system may consult additional databases in order to provide the user with other information regarding the artifact (e.g., facts regarding its history).

A flow chart depicting the operating steps of the present invention is shown in FIG. 1. The blocks in the diagram represent the functionality of the apparatus of the present invention. The flow chart is divided into two portions, representing the operation of the pointer tracker portion 100 and the object recognizer portion 102. After starting 104, a camera feeds a series of images into the system, with each whole image being a "frame" in the sequence of images. When the system prepares to search for the pointer within the first image, it sets the size of the search window equal to the whole frame or image 106. When the image frame is received 108, the system attempts to recognize the pointer in the search window 110. The recognition of the pointer in the case where the pointer is a human finger is performed through the use of a mean shift theorem-based color segmentation technique, which will be discussed in greater detail below. Although this color segmentation technique is discussed in great detail below, other well-known segmentation techniques can also be used, depending on the requirements of a particular embodiment. A few examples of other segmentation techniques include color segmentation using Gaussian Mixture Modeling; thresholding to a specific range in the color space by specifying the number of colors for quantization ahead of time; and color segmentation using Markov-random fields.

If the system fails to find the pointer in the search window 112, the system sets the search window equal to the whole image 106 and starts over. On the other hand, if the system finds the pointer 112, it then determines the position and trajectory of the pointer 114. As the pointer moves through the image space, the system attempts to determine whether it has completed the process of tracing a path in the image space 116. A path in the image space may be considered complete by the system when it wholly or partially encircles an area in the image. On the other hand, the user may indicate when a path is complete through other system commands. For example, the user may also indicate an object of interest by underlining, etc., in which case, it is more difficult for the system to determine when the path is complete. Once a path is completed, the system may alert the user, and may further request that the user confirm that the path completed was the path the user intended to input. These outputs from the system may be in the form of audio, visual, or kinesthetic signals.

If the process of tracing a path in the image space 116 has not been completed, the system then makes a prediction of the pointer's position in the next frame 118. This prediction is based on the Robust Tracking Filter described further below, which takes into account uncertainties associated with the movement of the pointer. Other tracking techniques, if adapted to accommodate uncertainties, may be used, a few examples of which include Kalman filters, Extended Kalman Filters, and Particle Filters. Once a prediction regarding the position of the pointer in the next image has been generated, the search window is reduced in size and adjusted within the next image frame such that it is positioned so that the actual position of the pointer is likely to be within its bounds in the next image 120. It is preferred that the search window be a rectangular window of fixed size based on the modeled uncertainty, centered on the predicted position of the pointer. However, in cases where the user's movement is familiar to the system, or in which a learning algorithm is applied to learn the user's habits, the position and shape of the search window may be tailored to maximize computational efficiency in light of the user's behaviors. Once the search window has been adjusted, the next image frame is processed 108, and the pointer tracking portion 100 continues to trace the path of the pointer until a path is completed 116.

Once a path has been completed 116, the object recognizer portion 102 receives an image segment representing the area indicated (surrounded) by the path. The path provided by the user may be thought of as a "coarse" segmentation used in order to indicate a region of interest for further processing in the object recognizer portion 102. The object recognizer portion 102 first segments the object indicated by the path 122 and then it recognizes the object 124 by extracting features from the area of the image representing the object and classifying the object based on the features. A variety of techniques may be used for this purpose, but invariant object recognition, which is discussed in detail below, is preferred because of its ability to accommodate changes in viewpoint. The preferred recognition technique uses a combination of factor analyzers and the EM algorithm to extract the features representing the object and then a K-nearest neighbor algorithm is used to classify the object. Other feature extraction techniques may be used, a few examples of which include color histogram matching methods, wavelet methods, DCT coefficient-based methods, texture-based methods, and edge-based methods. Examples of other classifier techniques that may be used include neural networks and support vector machines.

Once an object has been classified, additional or supplementary information regarding the object may be provided to the user from a database 126. This information may be presented in audio, visual, kinesthetic, or other forms, depending on the requirements of the specific embodiment. After the additional information has been provided to the user, the system may end or continue 128, at which point it stops 130 or begins to search either the whole image 106 or the search window 110 again to track the pointer and trace its path.

The blocks in the flowchart of FIG. 1 may also be viewed as a series of functional modules and sub-modules, representing either software or hardware modules depending on the particular embodiment. These modules operate within the processor and memory of a general-purpose or special-purpose computer system and may be in the form of software instructions or "hard-coded" electronic circuits.

Figure 2:
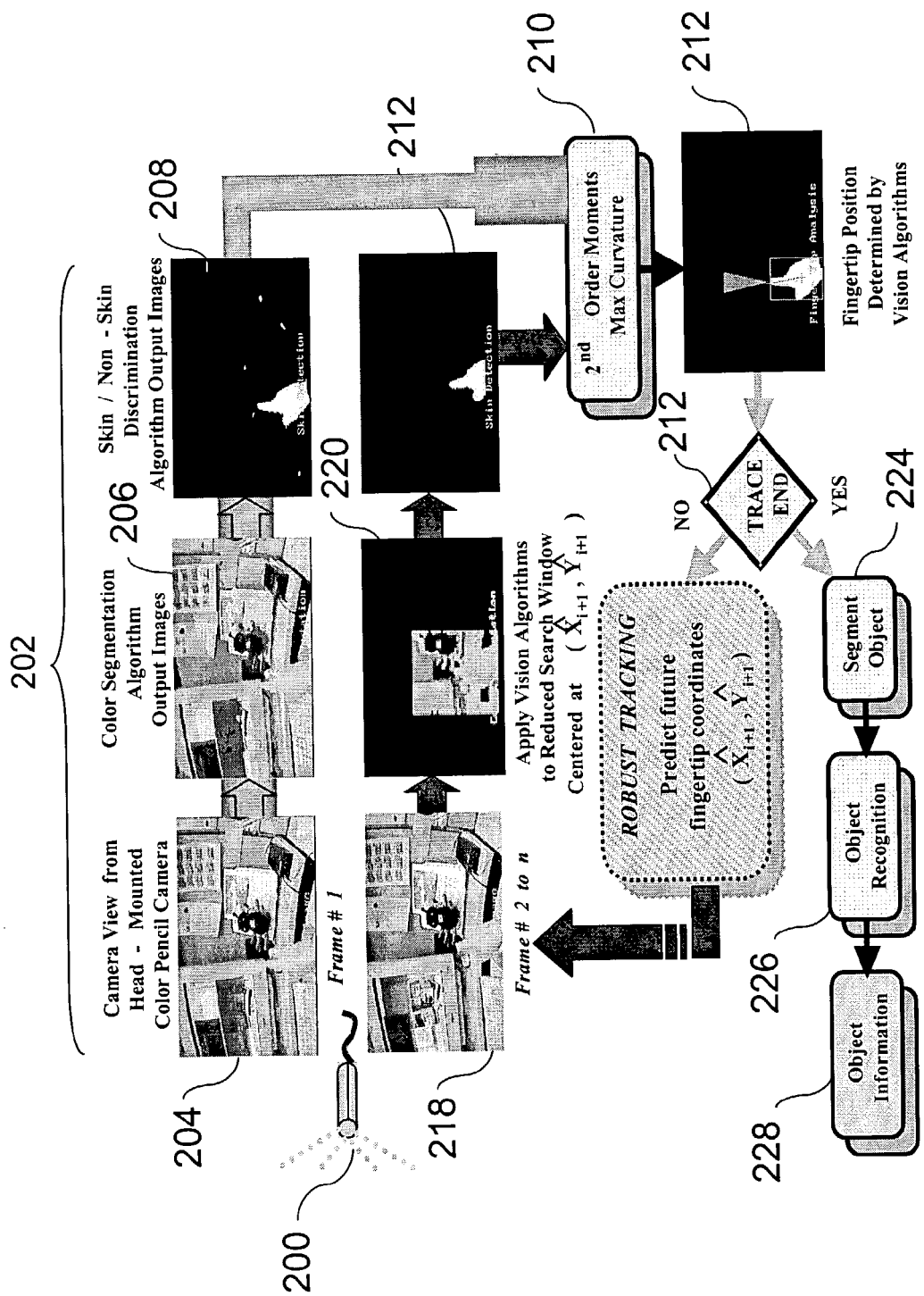
FIG. 2 is a block diagram depicting the components of a computer system used in the present invention.

A pictorial block diagram representing the steps/modules of the preferred embodiment of the present invention is shown in FIG. 2. A pencil camera 200, mounted on the head of a user provides a series of images. Because the search window for the first image frame is always the entire image, the first image frame is depicted as being processed on a separate, entire image processing path 202. Note that this is the same path that is followed whenever the pointer moves out of the field of view of the search window and the system has to reset the search window to search the entire image for the pointer. After the first image frame is received 204, the system segments the image to separate the pointer from the remainder of the image 206. The segmentation technique used in FIG. 2 is the preferred color segmentation method discussed in greater detail below. After the segmentation technique has been applied, a discrimination algorithm 208 is applied to distinguish between skin and non-skin colors in the case where the pointer is a human fingertip. Next, a geometric analysis 210, in this case based on second-order moments of maximum curvature, is applied to determine the position of a desired area of the pointer, e.g. the fingertip 212. Next, if the pointer tracing continues 214, a prediction is made regarding the position of the pointer in the next image frame 216, by means of the Robust Tracking Filter discussed further below. This prediction is used to position, within the next image frame 218, a reduced search window 220 in which to apply the discrimination algorithm. After discrimination, the geometric analysis 222 is applied before to determine the position of a desired area of the pointer, e.g. the fingertip 212.

Once the pointer tracing is complete 214, the object is segmented 224 and recognized 226, and information regarding the object may be provided to the user 228.

It is important to note that the components of the system of the present invention may all be localized onto a wearable computing system or they may be distributed across multiple machines at different locations. For example, the operations of the pointer tracker portion may be performed onboard a wearable computer worn by the user, and the traced portion of the image may be transmitted via a wired or wireless communication module to a remote computer where the object recognition is performed. The object classification can then be transmitted to another remote computer where information can be retrieved regarding the object, and transmitted back to the user. Many other physical combinations of the components of the present invention are possible without departing from the inventive concepts disclosed herein, as will be readily apparent to those of skill in the art.

The present invention has application in many possible fields, non-limiting examples of which include travel assistance, business advertisement, the design of smart living and working spaces, pervasive wireless services and Internet vehicles, air traffic control systems, aids to personnel in manufacturing, education, police, fire, military, and medical positions.

(3) Physical Embodiments of the Present Invention

The present invention has three principal "physical" embodiments. The first is an vision-based pointer tracking and object classification apparatus, typically but not limited to a computer system operating software in the form of a "hard-coded" instruction set. The second physical embodiment is a method, typically in the form of software, operated using a data processing system (computer). The third principal physical embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks and flash-type memories. These embodiments will be described in more detail below.

Figure 3:
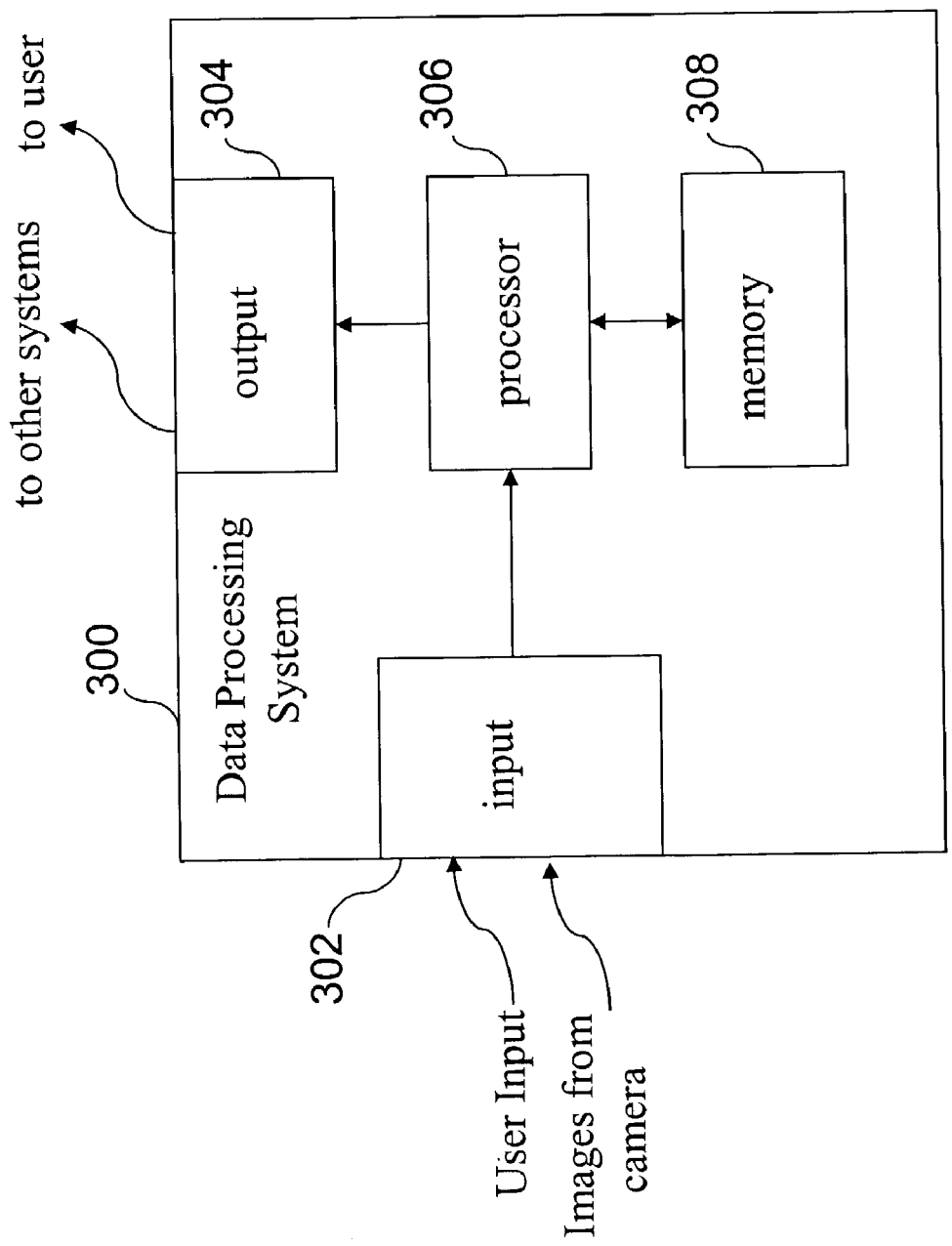
FIG. 3 is a block diagram depicting the components of a computer system used with the present invention.

A block diagram depicting the components of a computer system used in the present invention is provided in FIG. 3. The data processing system 300 comprises an input 302 for images from a camera, a small pencil-type camera. The input 302 may also be configured for receiving user input from another input device such as a microphone or a mouse. Note that the input 302 may include multiple "ports" for receiving data and user input, and may also be configured to receive information from remote databases using wired or wireless connections. The output 304 is connected with the processor for providing output to the user, on a video display but possibly through audio or kinesthetic signals (e.g., through pinching, vibrations, heat, etc.). Output may also be provided to other devices or other programs for use therein, possibly serving as a wired or wireless gateway to external databases or other processing devices. The input 302 and the output 304 are both coupled with a processor 306, which may be a general-purpose computer processor or a specialized processor designed specifically for use with the present invention. The processor 306 is coupled with a memory 308 to permit storage of data and software to be manipulated by commands to the processor.

Figure 4:
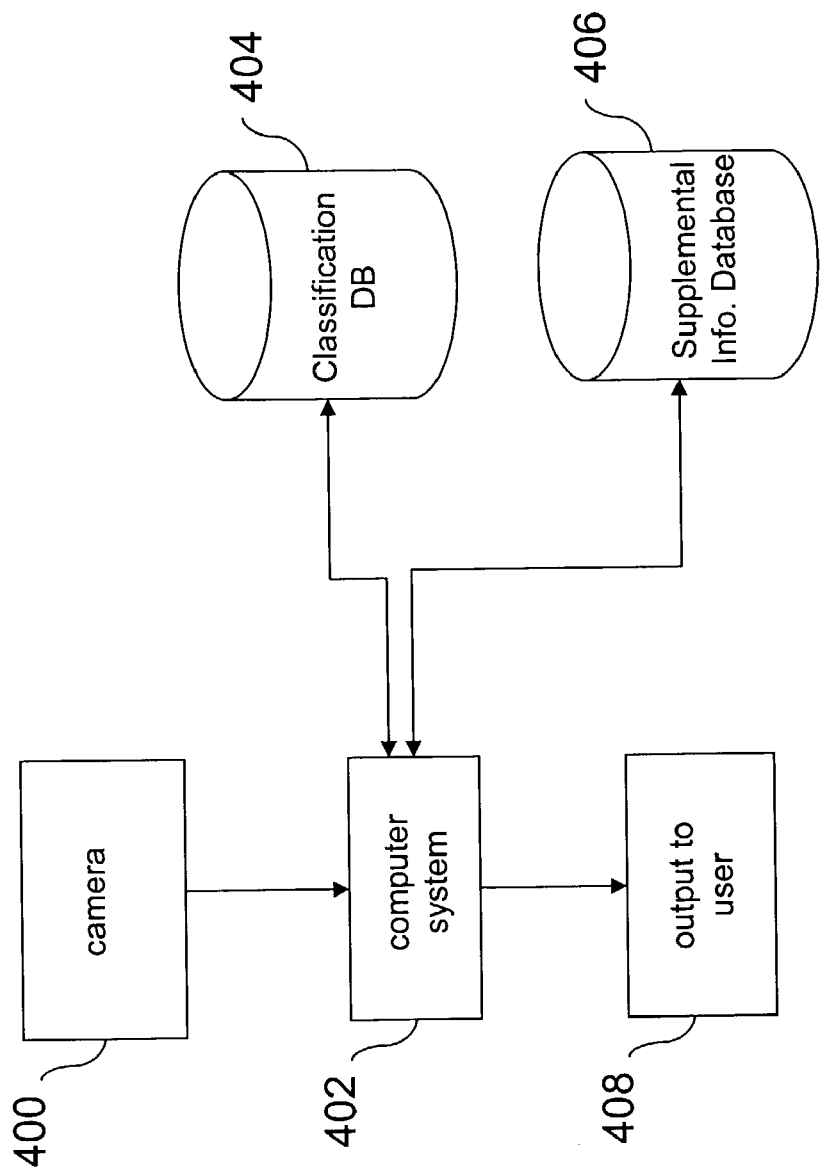
FIG. 4 is a system overview depicting an example embodiment of the present invention, showing one possible configuration of the computer system of FIG. 1 within a larger overall system.

A system overview depicting an example embodiment of the present invention, showing one possible configuration of the computer system of FIG. 1 within a larger overall system is shown in FIG. 4. A camera 400 provides a series of images to the computer system 402 regarding the scene at which the user is looking. A classification database 404 is connected with the computer 402, and contains a set of potential objects to which extracted features of a selected object are matched. Typically, to aid in computational efficiency, the classification database 404 is a database containing a catalog of only the objects likely to be encountered by the user in an area of reasonable size. It is desirable to limit the size of this database in order to ensure that the system does not spend an unreasonable time searching through the set of potential classes. A supplemental information database 406 is also connected with the computer so that once an object is classified, the user can retrieve supplemental information regarding the object that may then be outputted to a user through a user output 408 that is connected with the computer 402. As mentioned, there are a great number of potential configurations that could be substituted for the one presented in FIG. 4. For example, although the classification database 404 and the supplemental information database 406 are shown as separate from the computer system 402, they need not be. As a further example, although the connections between the components are depicted with solid lines representing physical connections, the connections may also be wireless.

Figure 5:
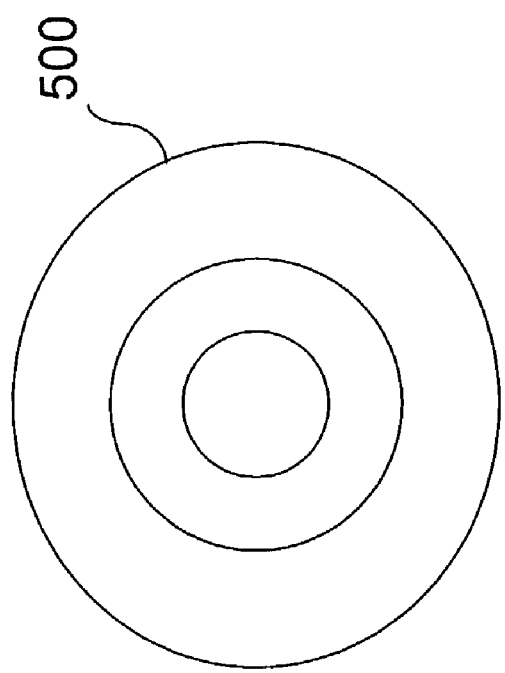
FIG. 5 is a is an illustrative diagram of a computer program product embodying the present invention.

An illustrative diagram of a computer program product embodying the present invention is depicted in FIG. 5. The computer program product 500 is depicted as an optical disk such as a CD or DVD. However, as mentioned previously, the computer program product generally represents computer readable code stored on any compatible computer readable medium.

(4) The Preferred Embodiments

The preferred embodiments of the various features discussed previously in the Overview section will be presented below.

a. The Pointer Tracking Portion

The general aspects of the pointer tracking portion were described above in relation to FIG. 1. Specifics regarding an embodiment will now be presented. In particular, detailed discussions are provided regarding the Robust Tracking Filter, the preferred pointer segmentation technique, and the preferred shape analysis technique. Then, a brief discussion regarding experimental results will be given.

i. The Robust Tracking Filter

The Robust Tracking Filter described herein is based on state-space estimation in which random variations are accounted for in the motion model, particularly for problems involving gesture-based human computer interfacing. The Robust Tracking Filter facilitates computational efficiency, memory savings, and real-time tracking by accurately predicting, within acceptable bounds, the future coordinate positions $\{x_{i+1}\ y_{i+1}\}$ of the pointer in the next video frame by using a robust state-space model, thus reducing the search area to a smaller search window, centered on the predicted location. For a wearable computer system, for example, these uncertainties can arise from the camera moving along with the user's head motion; the background and object moving independently of each other; the user standing still and then randomly walking; or the user's gesture or pointing finger abruptly changing directions at variable speeds. The need for the Robust Tracking Filter of the present invention arose from a need to control the influences of these uncertain environment conditions on system performance. The tracking capability provided by the Robust Tracking Filter can be used to quickly track and recognize pointing and hand gestures. This ability is essential to interfacing effectively with a wearable system, and can be applied to many multimedia applications. For example, while working on a digital desktop system, the user's fingertip could be made to act as a mouse and used to 'point to', 'encircle', 'click', and 'drag' virtual objects. Likewise, in the case of a wearable computer system, the user's fingertip could be used to point and to encircle objects of interest in a scene. In this way, a machine that is able to track the movements of the user's fingertip could convey to the user information about the identified objects.

As just mentioned, key to the design of human-machine gesture interface applications is the ability of the machine to quickly and efficiently identify, and track the hand movements of its user. In a wearable computer system equipped with head-mounted cameras, this task is extremely difficult due to the uncertain camera motion caused by the user's head movement, the user standing still then randomly walking, and the user's hand or pointing finger abruptly changing directions at variable speeds. Thus in one aspect, the present invention provides a tracking methodology based on a unique robust state-space estimation algorithm, which attempts to control the influence of uncertain environment conditions on the system's performance by adapting the tracking model to compensate for the uncertainties inherent in the data. For the preferred embodiment, which is adapted for tracking the finger of a user, the uncertainties associated with hand motion are modeled and applied to a robust state-space estimation algorithm used for tracking a user's pointing gesture. A comparison of our robust tracker against a typical Kalman filter-based tracker showed a 15% improvement in the estimated position error, and exhibited a faster response time.

A critical factor in human-machine interface applications is the ability of the machine to quickly and efficiently identify and interpret the hand gestures of its user. This capability can be useful in many circumstances. For example, while using a wearable computer system, the user's fingertip can be used to point to and encircle objects of interest in a scene. This ability is used in conjunction with the object recognizer in order to provide a system that tracks a pointer in order to allow a user to perform a coarse segmentation in order to indicate an object of interest for further processing by the object recognizer in order to classify the object and to provide further information regarding it to the user.

The Robust Tracking Filter is particularly useful in the system described herein for providing gesture-based interfaces between users and machines. This system enables a user to specify, segment, and recognize objects of interest, such as landmarks, by simply pointing at and encircling them (or otherwise indicating an interest in them) with the user's fingertip. In a preferred embodiment, this overall system accepts input from a color pencil camera, and segments the input video stream based on color. The color segmented image is then fed into a skin/non-skin discrimination algorithm to detect skin tones and extract the user's hand. Once the hand is extracted, shape and curvature analysis is used to determine the coordinate position of the fingertip.

Figure 6:
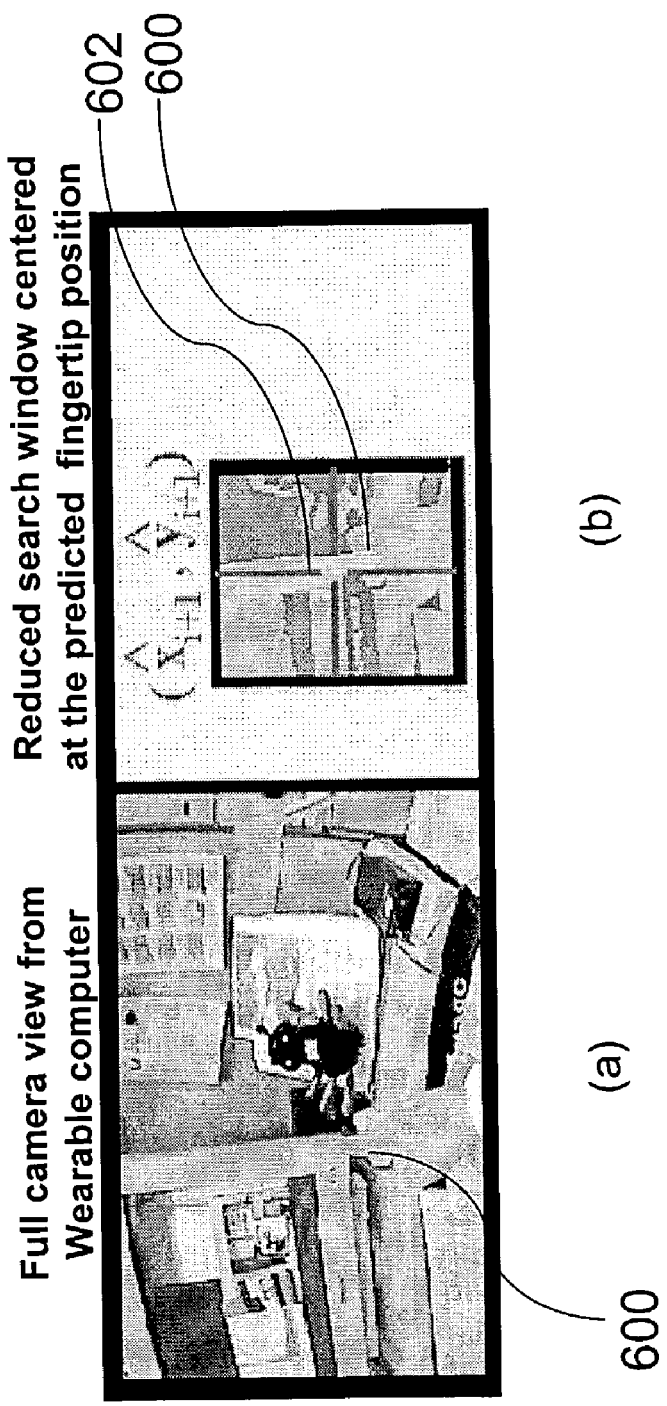
FIG. 6(a) is an image of a full camera view from a wearable computer, encompassing the area of a pointer.
FIG. 6(b) is an image depicting a smaller (reduced) search window, centered at the predicted fingertip position.

To perform the tracking of the fingertip position in real-time, a robust state-space tracker is used to predict the future user's fingertip position. The predicted position coordinates are used to center a small image search window around the expected fingertip position occurring in the next video (image) frame. In order to illustrate this point, FIG. 6(a) depicts a full camera view from a wearable computer, showing a users's finger 600, while FIG. 6(b) shows the smaller (reduced) search window, centered at the predicted fingertip position. The crosshairs 602 shown in FIG. 6(b) show the predicted fingertip for comparison with the actual position of the tip of the user's finger 600. Accurate prediction of the fingertip region of interest reduces the response time of the system and improves its memory and computational efficiencies. At the conclusion of the pointing gesture, the algorithm determines if an object has been selected by the user, and extracts it from the scene by cropping the region of interest. The segmented object is then classified, and any pre-stored information associated with the object is made available to the user. This system will be discussed in greater detail below in the section on the Object Recognizer.

The Robust Tracking Filter relies on a state-space model that describes the fingertip motion. Let T denote the frame capture rate for the wearable computer system (measured in seconds/frame), $\{\alpha_{x,i},\ \alpha_{y,i}\}$ denote the accelerations along the x and y directions (measured in pixels per second$^2$), and $\{v_{x,i},\ v_{y,i}\}$ denote the speeds along these same directions during the $i^{th}$ frame (measured in pixels/second). Thus, $$v_{x,i}=v_{x,i-1}+\alpha_{x,i-1}T, \tag{1}$$

$$v_{y,i}=v_{y,i-1}+\alpha_{y,i-1}T, \tag{2}$$

$$x_i \approx x_{i-1}+v_{x,i-1}T+\alpha_{x,i-1}T^2/2, \text{ and} \tag{3}$$

$$y_i \approx y_{i-1}+v_{y,i-1}T+\alpha_{y,i-1}T^2/2, \tag{4}$$

where $\{x_i, y_i\}$ refers to the position of the fingertip in the $i^{th}$ frame. These equations motivate the following robust state-space model with state vector $s_i$ and measurement vector $z_i$:

$$s_i \triangleq [\ x_i \quad y_i \quad v_{x,i} \quad v_{y,i} \quad \alpha_{x,i} \quad \alpha_{y,i}\ ]^T, \tag{5}$$

$$s_{i+1}=(F+\delta F)s_i+(G+\delta G)u_i, \tag{6}$$

$$z_i = Hs_i + v_i, \text{ and } z_i \triangleq [\ x_i \quad y_i ]^T, \tag{7}$$

with model parameters:

$$F = \begin{bmatrix} 1 & 0 & T & 0 & 0.5T^2 & 0 \\ 0 & 1 & 0 & T & 0 & 0.5T^2 \\ 0 & 0 & 1 & 0 & T & 0 \\ 0 & 0 & 0 & 1 & 0 & T \\ 0 & 0 & 0 & 0 & 1 & 0 \\ 0 & 0 & 0 & 0 & 0 & 1 \end{bmatrix} \text{ and} \quad (8)$$

$$H = \begin{bmatrix} 1 & 0 & 0 & 0 \\ 0 & 1 & 0 & 0 \end{bmatrix}, \quad (9)$$

and where $u_i$ and $v_i$ denote uncorrelated (zero-mean white Gaussian) process and measurement noises that satisfy $$E\left( \begin{bmatrix} s_0 \\ u_i \\ v_i \end{bmatrix} \begin{bmatrix} s_0 \\ u_j \\ v_j \end{bmatrix}^T \right) = \begin{bmatrix} \Pi_0 & 0 & 0 \\ 0 & Q\delta_{ij} & 0 \\ 0 & 0 & R\delta_{ij} \end{bmatrix}, \quad (10)$$

with corresponding covariance matrices Q and R. The entries of these covariance matrices are chosen for optimality by testing the whiteness of the resulting innovations process of this Robust Tracking Filter. The chosen values for R and Q meet a 95% confidence whiteness test following the methodology of R. K. Mehra in "On the identification of variances and adaptive Kalman filtering", *IEEE Transactions on Automatic Control*, AC-15, pp. 175–183, 1970. In addition, the measurement vector $z_i$ consists of the centered pixel coordinates that are provided by the vision algorithm locating the fingertip position. These coordinates can therefore be regarded as noisy measurements of the actual pixel coordinates $\{x_i, y_i\}$. By using the assumed state-space model, a variety of estimation techniques may be employed to 'clean' $z_i$ from measurement noise and to predict future movements of the $\{x_i, y_i\}$ fingertip coordinates.

As mentioned in the background discussion, it is well-known in the art that a central premise in the Kalman filtering formulation is the assumption that the underlying model parameters {F, G, H, R, Q} are accurate (in other words, that there is no uncertainty). When this assumption is violated, the performance of the filter can deteriorate appreciably. Thus, a robust alternative such as that presented herein must be applied. The term "robust" as used herein is intended to refer to limitations placed on the effect of model uncertainties on the overall filter performance. In the case of a wearable computer embodiment, one way to model the uncertainties is to treat the given parameters {F, G} as nominal values and to assume that the actual values lie within a certain set around them. Thus in the uncertain model presented above in equation (6), the perturbations {F, G} are modeled as $$[\delta F_i \delta G_i] = M\Delta_i [E_f E_g] \quad (11)$$

for some matrices $\{M, E_f, E_g\}$ and for an arbitrary contraction $\Delta_i$, $\|\Delta_i\| \leq 1$. For generality, the quantities $\{M, E_f, E_g\}$ can be allowed to vary with user activity. The model in equation (7) allows the designer to restrict the sources of uncertainties to a certain range space (defined by the matrix M), and to assign different levels of distortion by selecting the entries of $\{E_f, E_g\}$ appropriately. This is particularly useful in the case when the model changes dramatically in a particular time instance, such as when a user begins walking, coughing, or moving their head abruptly while being distracted. In this situation, the uncertainties $\delta F_i$ and $\delta G_i$ will have larger values than when the user is standing still. The system would then detect constant movement in the camera view, hinting at walking motion, and would switch the perturbation model to the "walking" uncertainty model.

Applying the time and measurement-update form of the Robust Tracking Filter presented herein to the uncertainty model presented in equations (4) and (5), where $\Pi_o > 0$, $R > 0$, $Q > 0$ are given weighting matrices, the following equations, which attempt to minimize the estimation error at the worst case possible created by the bounded uncertainties $\delta F_i$ and $\delta G_i$, result:

Initial conditions: Set $\hat{s}_{0|0} = P_{0|0}H^T R^{-1} z_0$ and $P_{0|0} = (\Pi_0^{-1} + H^T R^{-1} H)^{-1}$ Step 1. If HM=0, then set $\hat{\lambda}_i = 0$ (non-robust filter). Otherwise, select $\alpha$ (typically between 0 and 1) and set $\hat{\lambda}_i = (1+\alpha) \|M^T H^T R^{-1} H M\|$.

Step 2. Replace $\{Q, R, P_{i|i}, G, F\}$ by the following (respectively):

$\hat{Q}_i^{-1} = Q^{-1} + \hat{\lambda}_i E_g^T [I + \hat{\lambda}_i E_f P_{i|i} E_f^T]^{-1} E_g$, $\hat{R}_{i+1} = R - \hat{\lambda}_i^{-1} H M M^T H^T$, $\hat{P}_{i|i} = (P_{i|i}^{-1} + \hat{\lambda}_i E_f^T E_f)^{-1} = P_{i|i} - P_{i|i} E_f^T [\hat{\lambda}_i^{-1} I + E_f P_{i|i} E_f^T]^{-1} E_f P_{i|i}$, $\hat{G}_i = G - \hat{\lambda}_i F \hat{P}_{i|i} E_f^T E_g$, and $\hat{F}_i = (F - \hat{\lambda}_i \hat{G}_i \hat{Q}_i E_g^T E_f)(I - \hat{\lambda}_i \hat{P}_{i|i} E_f^T E_f)$.

If $\hat{\lambda}_i = 0$, then simply set $\hat{Q}_i = Q$, $\hat{R}_{i+1} = R$, $\hat{P}_{i|i} = P_{i|i}$, $\hat{G}_i = G$, and $\hat{F} = F$.

Step 3. Update $\{\hat{s}_{i|i}, P_{i|i}\}$ as follows:

$\hat{s}_{i+1} = \hat{F}_i \hat{s}_{i|i}$ and $\hat{s}_{i+1|i+1} = \hat{s}_{i+1} + P_{i+1|i+1} H^T \hat{R}_{i+1}^{-1} e_{i+1}$, where $e_{i=1} = z_{i+1} - H\hat{s}_{i+1}$, $P_{i=1} = F \hat{P}_{i|i} F^T + \hat{G}_i \hat{Q}_i \hat{G}_i^T$, $P_{i+1|i+1} = P_{i+1} - P_{i+1} H^T R_{e,i+1}^{-1} H P_{i+1}$, and $R_{e,i+1} = \hat{R}_{i+1} + H P_{i+1} H^T$.

Figure 7:
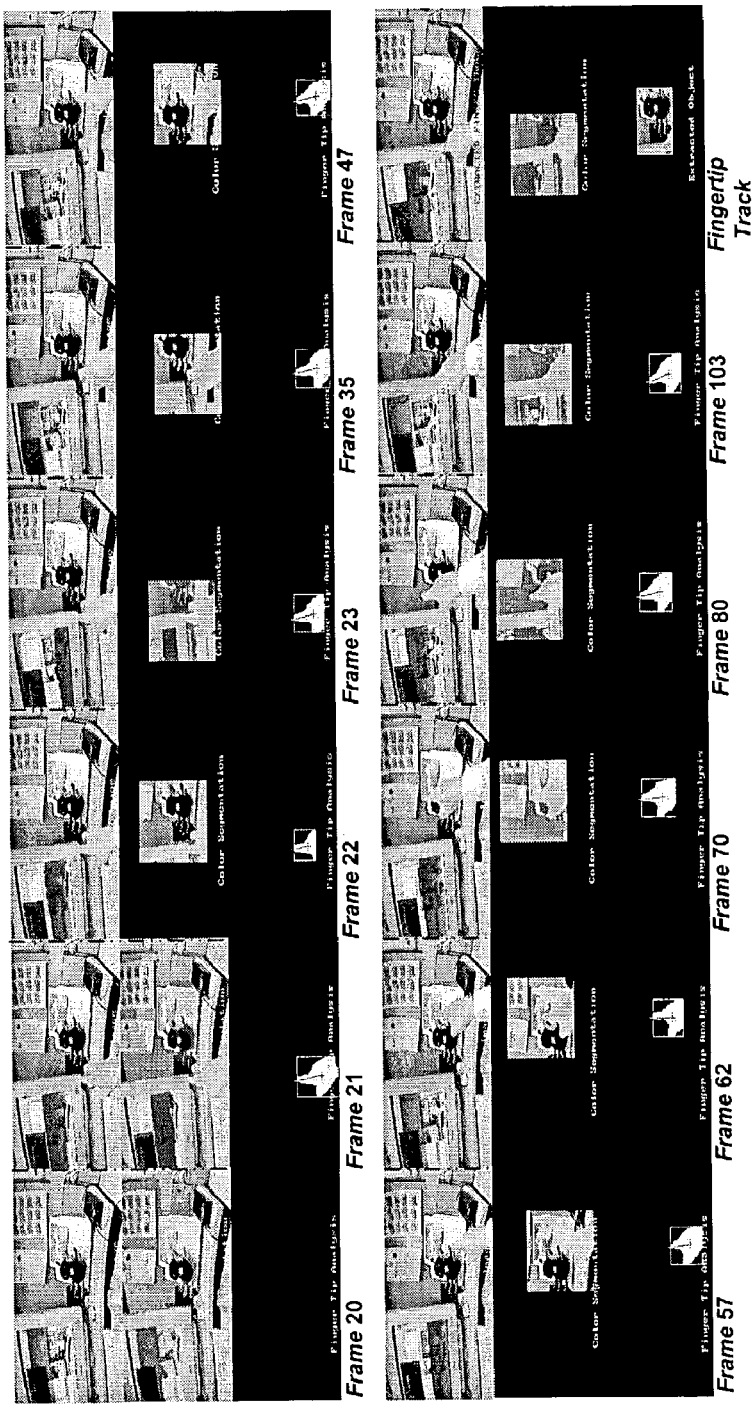
FIG. 7 is a series of image frames depicting example fingertip tracking results.

This Robust Tracking Filter was applied to a typical user's fingertip trajectory and the results were shown in FIG. 7. Note in the figure that the reduced search window is centered on the previously predicted fingertip position, and very closely overlaps the actual finger position.

The choice for the state matrix F gives higher weight to the previous fingertip coordinates, downplaying the estimates for acceleration and velocity. Although this is not necessary, it is beneficial because it yields results that are fairly reasonable in situations when the user is standing still and pointing at an object, e.g., when the velocity is constant and acceleration is non-existent. When the user is actively moving, on the other hand, uncertainties arise mainly in the acceleration and velocity models. Through experimentation $\{M, E_f, E_g\}$ have been found that account for the velocity and acceleration instabilities in the wearable system. These are:

$M = [0.5\ 0.5\ 0.25\ 0.25\ 0.125\ 0.125]^T$, $E_g = [0\ 0\ 0.3\ 0.3\ 0.9\ 0.9]$, and $E_f = [0\ 0\ 1\ 1\ 2\ 2]$.

ii. Pointer Segmentation

In the preferred embodiment where the pointer is a human finger, in order to determine the skin-like regions in the current frame, a color segmentation based on the fast and robust mean shift algorithm is performed. By using the mean shift algorithm, the number of dominant colors can be determined automatically, unlike the K-means clustering method where the initial number of classes must be chosen. Here, the intensity distribution of each color component in the current frame is viewed as a probability density function. The mean shift vector is the difference between the mean of the probability function on a local area and the center of this region. Mathematically, the mean shift vector associated with a region $S_{\vec{x}}$ centered on $\vec{x}$ can be written as:

$$\vec{V}(\vec{x}) = \frac{\int_{\vec{y} \in S_{\vec{x}}} p(\vec{y})(\vec{y} - \vec{x}) d\vec{y}}{\int_{\vec{y} \in S_{\vec{x}}} p(\vec{y}) d\vec{y}}, \quad (12)$$

where $p(\cdot)$ is the probability density function. The mean shift algorithm states that the mean shift vector is proportional to the gradient of the probability density $\nabla p(\vec{x})$, and reciprocal to the probability density $p(\vec{x})$, such that $$\vec{V}(\vec{x}) = c \frac{\nabla p(\vec{x})}{p(\vec{x})}, \quad (13)$$

where c is a constant. Since the mean shift vector is along the direction of the probability density function maximum, this property is exploited to find the actual location of the density maximum by searching for the mode of the density. One dominant color can be located by moving search windows in the color space using the mean shift vector iteratively. After removing all color inside the converged search window, the mean shift algorithm can be repeated again to locate the second dominant color. This process is repeated several times to identify a few major dominant colors which segment the image into like-color regions. The dominant colors of the current frame are used as the initial guess of dominant colors in the next frame, thus speeding up the computational time (taking advantage of the fact that adjacent frames are usually similar). After segmenting the current frame into homogeneous regions, a determination is made as to whether each region is skin-like by considering the mean hue and saturation values and geometric properties of the region. This region-based skin detection procedure has been found more robust to varying illumination conditions than pixel-based approaches.

iii. Shape Analysis of the Potential Pointer Segments

In the preferred embodiment where the pointer is a human finger, once the skin-like regions have been segmented, the image is "cleaned up" by applying morphological operations to minimize the number of artifacts being considered as having skin-like color properties. Geometric properties of the skin-like regions are used to identify the hand. Then the user's hand orientation with respect to the x-axis (i.e. pointing direction) is derived using central $2^{nd}$ order moments, and the fingertip position is determined as the point of maximum curvature along the contour of the hand.

iv. Experimental Results with the Robust Tracking Filter

Figure 8:
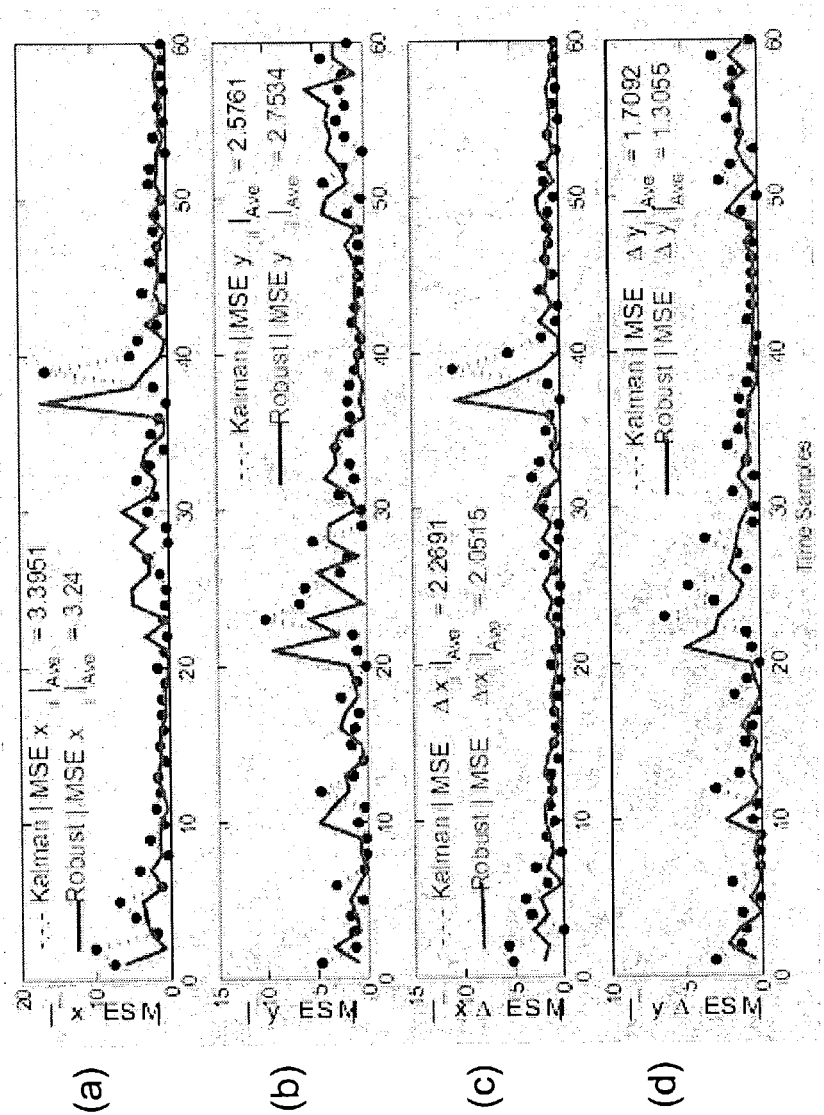
FIG. 8 is a graphical comparison of the mean-squared error (MSE) results for the position and velocity estimates between the plain Kalman tracker and the Robust Tracking Filter of the present invention, where

The above perturbation model has been applied along with the Robust Tracking Filter to the task of tracking a typical fingertip trajectory of a user encircling an object of interest. Referring again to FIG. 6(a) and FIG. 6(b), a single frame of the results is shown; with FIG. 6(a) showing a full camera view from a wearable computer system and FIG. 6(b) showing a view of the reduced search window centered at the predicted fingertip position were presented. As previously mentioned, in these figures, it can be seen that the Robust Tracking Filter enables accurate prediction of the fingertip position, since the reduced search window is centered around the previously predicted fingertip coordinates, which nearly overlaps the actual present fingertip position. The search window size, in this case, was chosen to encompass a region of at least twice the range of the maximum estimation errors, in the x and y directions, of the pointer tracking system discovered during application to a training sequence representative of a typical pointing finger trajectory. Therefore, the more accurate the tracker is, the smaller the search window needed, and the faster the overall system response time will be. The response time of the overall pointer tracking system was found to be 68% shorter than the response obtained by a system that used a full camera view to track the user's fingertip, and 23% shorter when compared with a system that uses a small search window centered around the previous fingertip position rather than the predicted future position. Example fingertip tracking results are shown over a sequence of image frames in FIG. 7, where the last frame shows the fingertip path and the extracted object of interest. A comparison of the MSE results for the position and velocity estimates between the plain Kalman tracker and the Robust Tracking Filter of the present invention are shown in FIG. 8, evidencing an improvement of over 15% in the estimation error. FIG. 8(a) to FIG. 8(d) depict the error in the estimates for a traditional Kalman filter and that of the Robust Tracking Filter of the present invention in the x and y position components as well as in the x and y velocity components, respectively.

b. The Object Recognizer

The combined pointer tracking system and object recognizer of the present invention provides human-computer interfacing for recognizing and displaying information concerning objects in a scene. The system performs real-time pointing gesture tracking to allow the user to encircle or otherwise indicate an object of interest in the scene, then a picture of the object is captured and passed on to the object recognizer module which performs object recognition in order to quickly identify the object or objects indicated by the user. The system then outputs (pre-stored) information, in visual form, concerning the object to the user, such as its classification, historical facts, etc. The object recognizer operates using an invariant object recognition technique as is described in detail below.

i. Invariant Object Recognition

Having located the scene object or landmark of interest, it is desirable to recognize it irrespective of pose, scale, rotation, and translation variations. The preferred approach to object recognition involves a multi-dimensional indexing scheme based on characterizing its local appearance by a vector of features extracted at salient points. Local descriptors are generally stable to slight changes in viewpoint, illumination, and partial occlusion. It is also desirable that the descriptors be highly discriminant so that objects may be easily distinguished. One technique by which this may be accomplished is to represent physical objects by an orthogonal family of local appearance descriptors obtained by applying principal component analysis (PCA) to image neighborhoods. The principal components with the largest variance are used to define a space for describing local appearance. Recognition is achieved by projecting local neighborhoods from newly acquired images onto the local appearance space and associating them to descriptors stored in a database. In another possible approach to local appearance modeling, the pattern space is first discretized by applying clustering using Vector Quantization (VQ), and then a projection basis is learned for each cluster. However, the preferred approach improves upon these methods of modeling local appearance by learning a collection of patterns within a mixture of factor analyzer (MFA) framework. The advantages of this approach are that the clustering and dimensionality reduction steps are performed simultaneously within a maximum-likelihood framework. In addition, the MFA model explicitly estimates the probability density of the class over the pattern space. Therefore, it can perform object detection based on the Bayes decision rule.

In the preferred object recognition approach, MFA modeling is used to learn a collection, or mixture, of local linear subspaces over the set of image patches or sub-regions extracted from the training set for each object class. By allowing a collection of subspaces to be learned, each can become specialized to the variety of structures present in the data ensemble. The cropped image containing the object of interest is first decomposed into a set of image patches (8×8 image patches are preferred) extracted at salient points. The image patches are extracted at only selected points in the image, in order to reduce the amount of data that must be processed. Salient points are defined as local features where the signal changes two-dimensionally. An example of a technique for finding salient features is disclosed in "Detection and tracking of point features" by C. Tomasi and T. Kanade, Technical Report CMU-CS-91-132, Carnegie Mellon University, Pittsburg, Pa., April 1991. In order to detect an object at any size, the process of extracting image patches at salient points is repeated over a range of magnification scales of the original image.

Factor analysis is a latent variable method for modeling the covariance structure of high dimensional data using a small number of latent variables called factors, where $\Lambda$ is known as the factor loading matrix. The factors z are assumed to be independent and Gaussian distributed with zero-mean unit variance, $z \sim N(0, I)$. The additive noise u is also normally distributed with zero-mean and a diagonal covariance matrix $\Psi$, $u \sim N(0, \Psi)$. Hence, the observed variables are independent given the factors, and x is therefore distributed with zero mean and covariance $\Lambda' \Lambda + \Psi$. The goal of factor analysis is to find the $\Lambda$ and $\Psi$ that best model the covariance structure of x. The factor variables z model correlations between the elements of x, while the u variables account for independent noise in each element of x. Factor analysis defines a proper probability density model over the observed space, and different regions of the input space can be locally modeled by assigning a different mean $\mu_j$, and index $\omega_j$ (where $j=1, \ldots, M$), to each factor analyzer.

The EM learning algorithm is used to learn the model parameters without the explicit computation of the sample covariance which greatly reduces the algorithm's computational complexity:

E-Step: Compute the moments $h_{ij}=E[\omega_j|x_i]$, $E[z|x_i, \omega_j]$, and $E[zz'|x_i, \omega_j]$ for all data points i and mixture components j given the current parameter values $\Lambda_j$, and $\Psi_j$.

M-Step: This results in the following update equations for the parameters:

$$\tilde{\Lambda}_j^{new} = (\Sigma_i h_{ij} x_i E[\tilde{z}|x_i, \omega_j]')(\Sigma_i h_{ij} E[\tilde{z}\tilde{z}'|x_i, \omega_j])^{-1}$$

$$\Psi_j^{new} = \frac{1}{n} diag\left\{\sum_{ij} h_{ij}(x_i - \tilde{\Lambda}_j^{new} E[\tilde{z}|x_i, \omega_j]) x_i'\right\}.$$

Although not crucial to the operation of the present invention, details on the derivation of these update equations may be found in "A compression framework for content analysis", by T. Keaton, and R. Goodman, *Proc. Workshop on Content-based Access of Image and Video Libraries,* Fort Collins, Colo., June 1999, pp. 68–73. These two steps are iterated until the model likelihood is maximized.

In the context of object recognition, it is of interest to calculate the probability of the object $O_i$ given a local feature measurement $x_k$ represented by the local image patch or subregion. Once the MFA model is fitted to each class of objects, the posterior probabilities for each subregion $x_k$ can easily be computed. The probability density function of the object class $O_i$ is given by:

$$p_i(x_k; \theta) = \sum_{m=1}^{M} P_{im} \aleph(\mu_{im}, \Lambda'_{im}\Lambda_{im} + \Psi_{im}),$$

where $\Theta_i$ is the set of MFA model parameters for $i^{th}$ object class, and $P_{im}$ is the mixing proportion for the $m^{th}$ model of the object class $O_i$. The posterior probability of object class $O_i$ given $x_k$ can be calculated by Bayes' rule:

$$P(O_i|x_k) = \frac{P_i p_i(x_k; \Theta_n)}{\sum_{n=1}^{N} P_n p_n(x_k; \Theta_n)},$$

where N is the total number of object classes and Pi is the priori probability of object class $O_i$ which is estimated from the training set of images. Without modeling the dependencies between the local subregions $x_k$, and assuming that K independent local feature measurements $(x_1, \ldots, x_K)$ have been extracted from an image, then the probability of each object class $O_i$ given the image patches may be computed by:

$$P(O_i|x_1, \ldots, x_k) = \frac{P_i p_i(x_i, \ldots, x_k; \Theta_n)}{\sum_{n=1}^{N} P_n p_n(x_i, \ldots, x_k; \Theta_n)} = \frac{\prod_k P_i p_i(x_k; \Theta_n)}{\prod_k \sum_{n=1}^{N} P_n p_n(x_k; \Theta_n)}.$$

Then, the optimum object class label i* for the image having a set of local measurements $(x_1, \ldots, x_K)$, is determined by Bayes decision rule as follows:

$$i^* = \operatorname*{argmax}_{i} P(O_i|x_1, \ldots, x_k).$$

Figure 9:
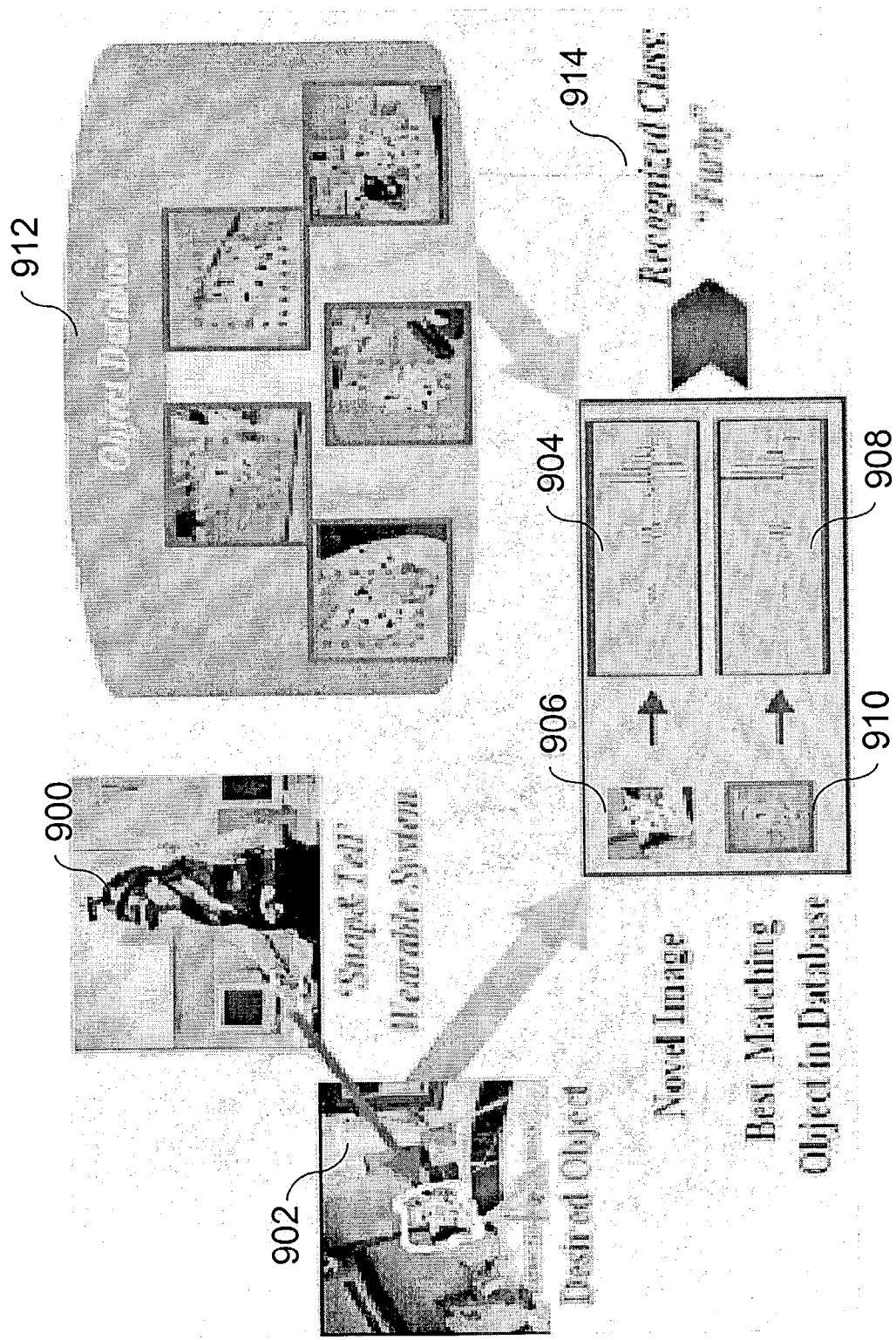
FIG. 9 is an illustration of the process of object recognition resulting from a wearable system designed in accordance with the present invention.

FIG. 9 provides an illustration of the process of object recognition resulting from a wearable system designed in accordance with the present invention, which is robust to small changes in viewpoint, scale and 3-dimensional rotations. A user first indicates a desired region of interest 900 by drawing a path around the object 902. Next, the features 904 extracted from the image 906 are matched against the features 908 of other objects 910 in a database 912 to find the best match 914, in this case the recognized class of "Furby".

ii. Experimental Results with the Robust Tracking Filter

Figure 10:
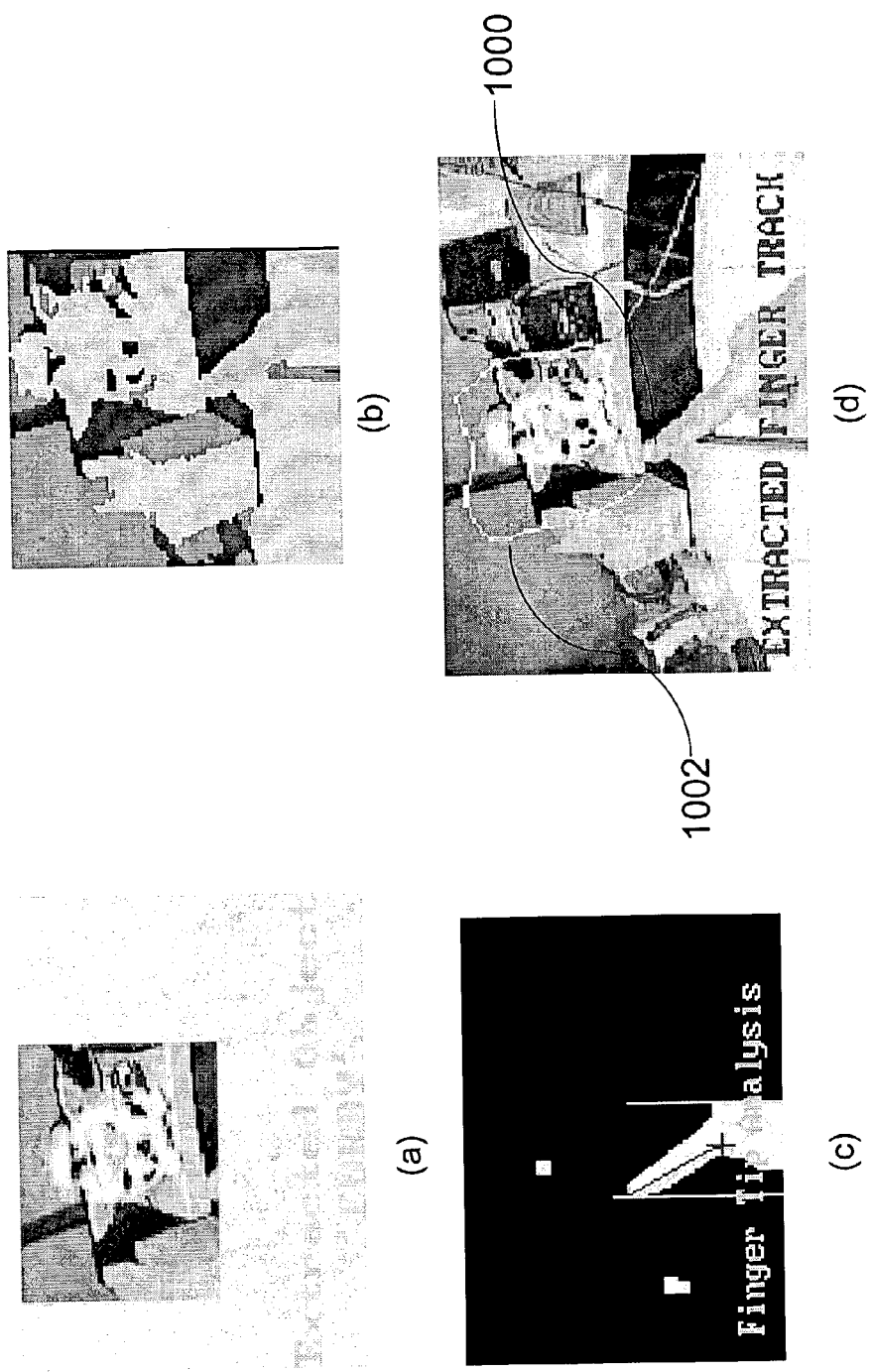
FIG. 10 is as series of images representing the various operations performed by the position tracking system and object recognizer of the present invention, where the system output is shown in FIG. 10(a); the results from first successfully performing color segmentation and fingertip analysis as shown in FIG. 10(b) and FIG. 10(c), respectively, and the tracked path of the user's fingertip is shown in FIG. 10(d).

An example output display of the position tracking system and object recognizer of the present invention is shown in FIG. 10. The output, shown in FIG. 10(*a*) results from first successfully performing color segmentation and fingertip analysis as shown in FIG. 10(*b*) and FIG. 10(*c*), respectively, and then tracking the user's fingertip 1000 as demonstrated by the path 1002 shown in FIG. 10(*d*). Finally, the object of interest is extracted at the end of the pointing gesture and recognized to provide the output shown in FIG. 10(*a*). This figure also illustrates how the Robust Tracking Filter helps to reduce the search area to a small window, thereby speeding up the processing of the vision algorithms. In this particular case, the response time of our overall system was 68% shorter than the response obtained by a system that uses a full camera view to track the user's fingertip, and 23% shorter when compared with a system that uses a small search window centered on the previous fingertip position (rather than the predicted future position).

As with the experiments on the pointer tracking system alone, which are discussed above, the size of the reduced search window was chosen to be at least twice the size of the maximum estimation errors in the x and y directions, of the tracker previously applied to a training sequence representative of a typical pointing finger trajectory ($\Delta Wx \geq 2 \tilde{x}_{max}, \Delta Wy \geq 2 \tilde{y}_{max}$). Therefore, the more accurate the tracker is, the smaller the search window needed and the shorter the overall system response time will be.

What is claimed is:

1. A vision-based pointer tracking system comprising:
a computer system including a processor, a memory coupled with the processor, an input coupled with the processor for receiving a series of image frames from a camera, and an output coupled with the processor for outputting a path of a pointer, the computer system further comprising means, residing in its processor and memory for:
searching a search window within the image frame for a portion of the window indicative of a pointer;
recognizing the pointer;
determining the position and trajectory of the pointer;
robustly predicting the position of the pointer in the next image frame in the series of image frames;
adjusting the search window within the next image frame such that the search window comprises a subset of the next image frame positioned so that the actual position of the pointer is likely to be within the search window in the next image frame;
tracking the path of the pointer through an area represented by the series of image frames; and
outputting the path of the pointer, whereby the means for robustly predicting the position of the pointer, combined with the adjusted search window enables the system to track the path of a pointer in a computationally efficient manner.

2. A vision-based pointer tracking system as set forth in claim 1, wherein the means for recognizing the pointer is a combination color segmenter and shape identifier, whereby the color segmenter operates on the search window to determine whether pointer candidates are present, and the shape identifier filters the pointer candidates to recognize the pointer within the search window.

3. A vision-based pointer tracking system as set forth in claim 2, wherein the means for recognizing the pointer is tailored for recognizing a finger of a user, whereby the color segmenter operates on the search window to find finger-colored portions of the search window, and the shape identifier filters the finger-colored portions of the search window in order to find the finger.

4. A vision-based pointer tracking system as set forth in claim 2, wherein the color segmenter is selected from a group consisting of a mean shift theorem algorithm used to adaptively quantize a color space to reduce the number of colors; a Gaussian mixture modeling algorithm; a thresholding algorithm used to limit the number of colors to a set designated apriori; and a Markov-random field algorithm.

5. A vision-based pointer tracking system as set forth in claim 4, wherein the means for recognizing the pointer is tailored for recognizing a finger of a user, whereby the color segmenter operates on the search window to find finger-colored portions of the search window, and the shape identifier filters the finger-colored portions of the search window in order to find the finger.

6. A vision-based pointer tracking system as set forth in claim 1, wherein the means for robustly predicting the position of the pointer is an algorithm selected from a group consisting of Kalman filters, Extended Kalman filters, and Particle filters and adapted to accommodate uncertainty.

7. A vision-based pointer tracking system as set forth in claim 1, wherein the means for adjusting the search window within the next frame centers a search window of predetermined size on the predicted position of the pointer.

8. A vision-based pointer tracking system as set forth in claim 7, wherein the size of the search window is determined as a function of the uncertainty in the motion of the pointer.

9. A vision-based pointer tracking system as set forth in claim 1, wherein the search window has a size and a shape, and wherein the means for adjusting the search window adjusts size and shape of the search window based on historical pointer movements.

10. A vision-based pointer tracking system as set forth in claim 1, where when a pointer is not recognized in the search window, the search window is redefined to encompass the entire image frame so that recognition may be attempted again in a larger area.

11. A vision-based pointer tracking system as set forth in claim 1, wherein the means for robustly predicting the position of the pointer is a Robust Tracking Filter.

12. A vision-based pointer tracking system as set forth in claim 11, wherein the means for recognizing the pointer is tailored for recognizing a finger of a user, whereby a color segmenter operates on the search window to find finger-colored portions of the search window, and a shape identifier filters finger-colored portions of the search window in order to find the finger.

13. A vision-based pointer tracking system as set forth in claim 11, wherein the means for recognizing the pointer is a combination color segmenter and shape identifier, whereby the color segmenter operates on the search window to determine the presence of pointer candidates, and the shape identifier filters the pointer candidates to recognize the pointer within the search window.

14. A vision-based pointer tracking system as set forth in claim 13, wherein the color segmenter selected from a group consisting of a mean shift theorem algorithm used to adaptively quantize a color space to reduce the number of colors; a Gaussian mixture modeling algorithm; a thresholding algorithm used to limit the number of colors to a set designated apriori; and a Markov-random field algorithm.

15. A vision-based pointer tracking system as set forth in claim 14, wherein the means for recognizing the pointer is tailored for recognizing a finger of a user, whereby the color segmenter operates on the search window to find finger-colored portions of the search window, and the shape identifier filters the finger-colored portions of the search window in order to find the finger.

16. A vision-based pointer tracking system as set forth in claim 15, wherein the search window has a size and a shape, and wherein the means for adjusting the search window adjusts size and shape of the search window based on historical pointer movements.

17. A vision-based pointer tracking system as set forth in claim 15, wherein the means for adjusting the search window within the next frame centers a search window of predetermined size on the predicted position of the pointer.

18. A vision-based pointer tracking system as set forth in claim 17, wherein the size of the search window is determined as a function of the uncertainty in the motion of the pointer.

19. A vision-based pointer tracking system as set forth in claim 18, where when a pointer is not recognized in the search window, the search window is redefined to encompass the entire image frame so that recognition may be attempted again in a larger area.

20. A vision-based pointer tracking system as set forth in claim 1, wherein the output is configured to provide the path of the pointer to an object recognizer system residing in the processor and memory, with the object recognizer comprising means for:
    segmenting an object indicated by the path of the pointer; and
    recognizing the object, whereby the pointer may be used to indicate an area in which an object to be recognized resides, and the system can then segment and recognize the object from a scene.

21. A vision-based pointer tracking system as set forth in claim 20, wherein the means for recognizing the object comprises means for:
    extracting features from the segmented object; and
    classifying the object based on the extracted features to generate an object classification.

22. A vision-based pointer tracking system as set forth in claim 21, wherein the output of the system is configured to output the object classification.

23. A vision-based pointer tracking system as set forth in claim 22, wherein the output is connected with a database system, such that the object classification is communicated with the database system, and wherein the input is connected with the database system to receive supplementary information regarding the classified object; whereby once an object is classified, information regarding its classification is sent to a database in order to retrieve stored information regarding the object.

24. A vision-based pointer tracking system as set forth in claim 23, wherein the output of the system is configured to provide the user with at least one type of feedback selected from a group consisting of audio feedback, visual feedback, and kinesthetic feedback based on the path of the pointer, whereby the system can indicate when a path is completed for the recognition process to begin.

25. A vision-based pointer tracking system as set forth in claim 23, wherein the output of the system is configured to provide the user with at least one type of feedback selected from a group consisting of audio feedback, visual feedback, and kinesthetic feedback based on the classification of the object.

26. A vision-based pointer tracking system as set forth in claim 21, wherein the output of the system is configured to provide the user with at least one type of feedback selected from a group consisting of audio feedback, visual feedback, and kinesthetic feedback based on the path of the pointer, whereby the system can indicate when a path is completed for the recognition process to begin.

27. A vision-based pointer tracking system as set forth in claim 21, wherein the output of the system is configured to provide the user with at least one type of feedback selected from a group consisting of audio feedback, visual feedback, and kinesthetic feedback based on the classification of the object.

28. A vision-based pointer tracking system as set forth in claim 21, wherein the system further comprises a database, and wherein the classification of the object is communicated with the database and the database, in turn, recalls supplementary information regarding the object.

29. A vision-based pointer tracking system as set forth in claim 28, wherein the output of the system is configured to provide at least one type of feedback selected from a group consisting of audio feedback, visual feedback, and kinesthetic feedback based on the path of the pointer, whereby the system can indicate when a path is completed for the recognition process to begin.

30. A vision-based pointer tracking system as set forth in claim 28, wherein the output of the system is configured to provide the user with at least one type of feedback selected from a group consisting of audio feedback, visual feedback, and kinesthetic feedback based on the classification of the object.

31. A vision-based pointer tracking system as set forth in claim 21, wherein the means for extracting features from the segmented object is selected from a group consisting of a combination of factor analyzing algorithms and an EM algorithm, a color histogram matching algorithm, a wavelet algorithm, a DCT coefficient algorithm, a texture-based algorithm, and an edge-based algorithm.

32. A vision-based pointer tracking system as set forth in claim 31, wherein the means for classifying the object based on the extracted features is selected from a group consisting of a K-nearest neighbor algorithm, a neural network, and a support vector machine.

33. A vision-based pointer tracking system as set forth in claim 32, wherein the output of the system is configured to output the object classification.

34. A vision-based pointer tracking system as set forth in claim 33, wherein the output is connected with a database system, such that the object classification is communicated with the database system, and wherein the input is connected with the database system to receive supplementary information regarding the classified object; whereby once an object is classified, information regarding its classification is sent to a database in order to retrieve stored information regarding the object.

35. A vision-based pointer tracking system as set forth in claim 34, wherein the output of the system is configured to provide the user with at least one type of feedback selected from a group consisting of audio feedback, visual feedback, and kinesthetic feedback based on the path of the pointer, whereby the system can indicate when a path is completed for the recognition process to begin.

36. A vision-based pointer tracking system as set forth in claim 34, wherein the output of the system is configured to provide the user with at least one type of feedback selected from a group consisting of audio feedback, visual feedback, and kinesthetic feedback based on the classification of the object.

37. A vision-based pointer tracking system as set forth in claim 32, wherein the output of the system is configured to provide the user with at least one type of feedback selected from a group consisting of audio feedback, visual feedback, and kinesthetic feedback based on the path of the pointer, whereby the system can indicate when a path is completed for the recognition process to begin.

38. A vision-based pointer tracking system as set forth in claim 32, wherein the output of the system is configured to provide the user with at least one type of feedback selected from a group consisting of audio feedback, visual feedback, and kinesthetic feedback based on the classification of the object.

39. A vision-based pointer tracking system as set forth in claim 32, wherein the system further comprises a database, and wherein the classification of the object is communicated with the database and the database, in turn, recalls supplementary information regarding the object.

40. A vision-based pointer tracking system as set forth in claim 39, wherein the output of the system is configured to provide the user with at least one type of feedback selected from a group consisting of audio feedback, visual feedback, and kinesthetic feedback based on the path of the pointer, whereby the system can indicate when a path is completed for the recognition process to begin.

41. A vision-based pointer tracking system as set forth in claim 39, wherein the output of the system is configured to provide the user with at least one type of feedback selected from a group consisting of audio feedback, visual feedback, and kinesthetic feedback based on the classification of the object.

42. A vision-based pointer tracking system as set forth in claim 21, wherein the means for classifying the object based on the extracted features is selected from a group consisting of a K-nearest neighbor algorithm, a neural network, and a support vector machine.

43. A vision-based pointer tracking system as set forth in claim 42, wherein the output of the system is configured to output the object classification.

44. A vision-based pointer tracking system as set forth in claim 43, wherein the output is connected with a database system, such that the object classification is communicated with the database system, and wherein the input is connected with the database system to receive supplementary information regarding the classified object; whereby once an object is classified, information regarding its classification is sent to a database in order to retrieve stored information regarding the object.

45. A vision-based pointer tracking system as set forth in claim 44, wherein the output of the system is configured to provide the user with at least one type of feedback selected from a group consisting of audio feedback, visual feedback, and kinesthetic feedback based on the path of the pointer, whereby the system can indicate when a path is completed for the recognition process to begin.

46. A vision-based pointer tracking system as set forth in claim 44, wherein the output of the system is configured to provide the user with at least one type of feedback selected from a group consisting of audio feedback, visual feedback, and kinesthetic feedback based on the classification of the object.

47. A vision-based pointer tracking system as set forth in claim 42, wherein the output of the system is configured to provide the user with at least one type of feedback selected from a group consisting of audio feedback, visual feedback, and kinesthetic feedback based on the path of the pointer, whereby the system can indicate when a path is completed for the recognition process to begin.

48. A vision-based pointer tracking system as set forth in claim 42, wherein the output of the system is configured to provide the user with at least one type of feedback selected from a group consisting of audio feedback, visual feedback, and kinesthetic feedback based on the classification of the object.

49. A vision-based pointer tracking system as set forth in claim 42, wherein the system further comprises a database, and wherein the classification of the object is communicated with the database and the database, in turn, recalls supplementary information regarding the object.

50. A vision-based pointer tracking system as set forth in claim 49, wherein the output of the system is configured to provide the user with at least one type of feedback selected from a group consisting of audio feedback, visual feedback, and kinesthetic feedback based on the path of the pointer, whereby the system can indicate when a path is completed for the recognition process to begin.

51. A vision-based pointer tracking system as set forth in claim 49, wherein the output of the system is configured to provide the user with at least one type of feedback selected from a group consisting of audio feedback, visual feedback, and kinesthetic feedback based on the classification of the object.

52. A vision-based pointer tracking system as set forth in claim 20, wherein the means for recognizing the object comprises a means for extracting features from the segmented object, and wherein the output of the system is configured to output the extracted features.

53. A vision-based pointer tracking system as set forth in claim 20, wherein the means for robustly predicting the position of the pointer is a Robust Tracking Filter.

54. A vision-based pointer tracking system as set forth in claim 53, wherein the means for recognizing the pointer is tailored for recognizing a finger of a user, whereby the color segmenter operates on the search window to find finger-colored portions of the search window, and the shape identifier filters the finger-colored portions of the search window in order to find the finger.

55. A vision-based pointer tracking system as set forth in claim 53, wherein the means for recognizing the pointer is a combination color segmenter and shape identifier, whereby the color segmenter operates on the search window to determine the presence of pointer candidates, and the shape identifier filters the pointer candidates to recognize the pointer within the search window.

56. A vision-based pointer tracking system as set forth in claim 55, wherein the color segmenter selected from a group consisting of a mean shift theorem algorithm used to adaptively quantize a color space to reduce the number of colors; a Gaussian mixture modeling algorithm; a thresholding algorithm used to limit the number of colors to a set designated apriori; and a Markov-random field algorithm.

57. A vision-based pointer tracking system as set forth in claim 56, wherein the means for recognizing the pointer is tailored for recognizing a finger of a user, whereby the color segmenter operates on the search window to find finger-colored portions of the search window, and the shape identifier filters the finger-colored portions of the search window in order to find the finger.

58. A vision-based pointer tracking system as set forth in claim 57, wherein the search window has a size and a shape, and wherein the means for adjusting the search window adjusts size and shape of the search window based on historical pointer movements.

59. A vision-based pointer tracking system as set forth in claim 57, wherein the means for adjusting the search window within the next frame centers a search window of predetermined size on the predicted position of the pointer.

60. A vision-based pointer tracking system as set forth in claim 59, wherein the size of the search window is determined as a function of the uncertainty in the motion of the pointer.

61. A vision-based pointer tracking system as set forth in claim 60, where when a pointer is not recognized in the search window, the search window is redefined to encompass the entire image frame so that recognition may be attempted again in a larger area.

62. A method for vision-based pointer tracking comprising the steps of:
receiving a series of image frames from a camera;
searching a search window within the frame for a portion of the window indicative of a pointer;
recognizing the pointer;
determining the position and trajectory of the pointer;
robustly predicting the position of the pointer in the next image frame in the series of image frames;
adjusting the search window within the next image frame such that the search window comprises a subset of the next image frame positioned so that the actual position of the pointer is likely to be within the search window in the next image frame;
tracking the path of the pointer through an area represented by the series of image frames; and
outputting the path of the pointer, whereby the step of robustly predicting the position of the pointer, combined with the adjusted search window enables tracking of the path of a pointer in a computationally efficient manner.

63. A method for vision-based pointer tracking as set forth in claim 62, wherein the step of recognizing the pointer performs a combination of a color segmenting step and a shape identifying step, whereby the color segmenting step operates on the search window to determine the presence of pointer candidates, and the shape identifying step filters the pointer candidates to recognize the pointer within the search window.

64. A method for vision-based pointer tracking as set forth in claim 63, wherein the step of recognizing the pointer is tailored for recognizing a finger of a user, whereby the color segmenting step operates on the search window to find finger-colored portions of the search window, and the shape identifying step filters the finger-colored portions of the search window in order to find the finger.

65. A method for vision-based pointer tracking as set forth in claim 63, wherein the color segmenting step performs an algorithm selected from a group consisting of a mean shift theorem algorithm used to adaptively quantize a color space to reduce the number of colors; a Gaussian mixture modeling algorithm; a thresholding algorithm used to limit the number of colors to a set designated apriori; and a Markov-random field algorithm.

66. A method for vision-based pointer tracking as set forth in claim 63, wherein the step of recognizing the pointer is tailored for recognizing a finger of a user, whereby the color segmenting step operates on the search window to find finger-colored portions of the search window, and the shape identifying step filters the finger-colored portions of the search window in order to find the finger.

67. A method for vision-based pointer tracking as set forth in claim 62, wherein the step of robustly predicting the position of the pointer performs an algorithm selected from a group consisting of Kalman filters, Extended Kalman filters, and Particle filters and adapted to accommodate uncertainty.

68. A method for vision-based pointer tracking as set forth in claim 62, wherein the step of adjusting the search window within the next frame centers a search window of predetermined size on the predicted position of the pointer.

69. A method for vision-based pointer tracking as set forth in claim 68, wherein further comprising a step of determining the size of the search window as a function of the uncertainty in the motion of the pointer.

70. A method for vision-based pointer tracking as set forth in claim 62, wherein the search window has a size and a shape, and wherein the step of adjusting the search window adjusts size and shape of the search window based on historical pointer movements.

71. A method for vision-based pointer tracking as set forth in claim 62, where when a pointer is not recognized in the search window, a step of redefining the search window is performed, redefining the search window to encompass the entire image frame so that recognition may be attempted again in a larger area.

72. A method for vision-based pointer tracking as set forth in claim 62, wherein the step of robustly predicting the position of the pointer is performed by a Robust Tracking Filter based on state-space estimation.

73. A method for vision-based pointer tracking as set forth in claim 72, wherein the method further comprises a color segmenting step and a shape identifying step, wherein the step of recognizing the pointer is tailored for recognizing a finger of a user, whereby the color segmenting step operates on the search window to find finger-colored portions of the search window, and the shape identifying step filters the finger-colored portions of the search window in order to find the finger.

74. A method for vision-based pointer tracking as set forth in claim 72, wherein the step of recognizing the pointer performs a combination of a color segmenting step and a shape identifying step, whereby the color segmenting step operates on the search window to determine the presence of pointer candidates, and the shape identifying step filters the pointer candidates to recognize the pointer within the search window.

75. A method for vision-based pointer tracking as set forth in claim 74, wherein the color segmenting step performs an algorithm selected from a group consisting of a mean shift theorem algorithm used to adaptively quantize a color space to reduce the number of colors; a Gaussian mixture modeling algorithm; a thresholding algorithm used to limit the number of colors to a set designated apriori; and a Markov-random field algorithm.

76. A method for vision-based pointer tracking as set forth in claim 75, wherein the step of recognizing the pointer is tailored for recognizing a finger of a user, whereby the color segmenter operates on the search window to find finger-colored portions of the search window, and the shape identifier filters the finger-colored portions of the search window in order to find the finger.

77. A method for vision-based pointer tracking as set forth in claim 76, wherein the search window has a size and a shape, and wherein the step of adjusting the search window adjusts size and shape of the search window based on historical pointer movements.

78. A method for vision-based pointer tracking as set forth in claim 76, wherein the step of adjusting the search window within the next frame centers a search window of predetermined size on the predicted position of the pointer.

79. A method for vision-based pointer tracking as set forth in claim 78, wherein further comprising a step of determining the size of the search window as a function of the uncertainty in the motion of the pointer.

80. A method for vision-based pointer tracking as set forth in claim 79, where when a pointer is not recognized in the search window, a step of redefining the search window is performed, redefining the search window to encompass the entire image frame so that recognition may be attempted again in a larger area.

81. A method for vision-based pointer tracking as set forth in claim 62, wherein the output is configured to provide the path of the pointer to an object recognizer system residing in the processor and memory, with the object recognizer comprising step of:
 segmenting an object indicated by the path of the pointer; and
 recognizing the object, whereby the pointer may be used to indicate an area in which an object to be recognized resides, and the system can then segment and recognize the object from a scene.

82. A method for vision-based pointer tracking as set forth in claim 81, wherein the step of recognizing the object comprises the steps of:
 extracting features from the segmented object; and
 classifying the object based on the extracted features to generate an object classification.

83. A method for vision-based pointer tracking as set forth in claim 82, wherein the outputting step outputs the object classification.

84. A method for vision-based pointer tracking as set forth in claim 83, further comprising steps of communicating the object classification with a database system, and receiving supplementary information regarding the classified object; whereby once an object is classified, information regarding its classification is sent to a database in order to retrieve stored information regarding the object.

85. A method for vision-based pointer tracking as set forth in claim 84, wherein the in the step of outputting, the user is provided with at least one type of feedback selected from a group consisting of audio feedback, visual feedback, and kinesthetic feedback based on the path of the pointer, whereby the method indicates when a path is completed for the recognition process to begin.

86. A method for vision-based pointer tracking as set forth in claim 84, wherein in the step of outputting, the user is provided with at least one type of feedback selected from a group consisting of audio feedback, visual feedback, and kinesthetic feedback based on the classification of the object.

87. A method for vision-based pointer tracking as set forth in claim 82, wherein the in the step of outputting, the user is provided with at least one type of feedback selected from a group consisting of audio feedback, visual feedback, and kinesthetic feedback based on the path of the pointer, whereby the method indicates when a path is completed for the recognition process to begin.

88. A method for vision-based pointer tracking as set forth in claim 82, wherein in the step of outputting, the user is provided with at least one type of feedback selected from a group consisting of audio feedback, visual feedback, and kinesthetic feedback based on the classification of the object.

89. A method for vision-based pointer tracking as set forth in claim 82, wherein the step of extracting features from the segmented object is an algorithm selected from a group consisting of a combination of factor analyzing algorithms and an EM algorithm, a color histogram matching algorithm, a wavelet algorithm, a DCT coefficient algorithm, a texture-based algorithm, and an edge-based algorithm.

90. A method for vision-based pointer tracking as set forth in claim 89, wherein the step of classifying the object based on the extracted features is a technique selected from a group consisting of a K-nearest neighbor algorithm, a neural network, and a support vector machine.

91. A method for vision-based pointer tracking as set forth in claim 90, wherein the outputting step outputs the object classification.

92. A method for vision-based pointer tracking as set forth in claim 91, further comprising steps of communicating the object classification with a database system, and receiving supplementary information regarding the classified object; whereby once an object is classified, information regarding its classification is sent to a database in order to retrieve stored information regarding the object.

93. A method for vision-based pointer tracking as set forth in claim 92, wherein the in the step of outputting, the user is provided with at least one type of feedback selected from a group consisting of audio feedback, visual feedback, and kinesthetic feedback based on the path of the pointer, whereby the method indicates when a path is completed for the recognition process to begin.

94. A method for vision-based pointer tracking as set forth in claim 92, wherein in the step of outputting, the user is provided with at least one type of feedback selected from a group consisting of audio feedback, visual feedback, and kinesthetic feedback based on the classification of the object.

95. A method for vision-based pointer tracking as set forth in claim 90, wherein the in the step of outputting, the user is provided with at least one type of feedback selected from a group consisting of audio feedback, visual feedback, and kinesthetic feedback based on the path of the pointer, whereby the method indicates when a path is completed for the recognition process to begin.

96. A method for vision-based pointer tracking as set forth in claim 90, wherein in the step of outputting, the user is provided with at least one type of feedback selected from a group consisting of audio feedback, visual feedback, and kinesthetic feedback based on the classification of the object.

97. A method for vision-based pointer tracking as set forth in claim 82, wherein the step of classifying the object based on the extracted features is a technique selected from a group consisting of a K-nearest neighbor algorithm, a neural network, and a support vector machine.

98. A method for vision-based pointer tracking as set forth in claim 97, wherein the outputting step outputs the object classification.

99. A method for vision-based pointer tracking as set forth in claim 98, further comprising steps of communicating the object classification with a database system, and receiving supplementary information regarding the classified object; whereby once an object is classified, information regarding its classification is sent to a database in order to retrieve stored information regarding the object.

100. A method for vision-based pointer tracking as set forth in claim 99, wherein the in the step of outputting, the user is provided with at least one type of feedback selected from a group consisting of audio feedback, visual o feedback, and kinesthetic feedback based on the path of the pointer, whereby the method indicates when a path is completed for the recognition process to begin.

101. A method for vision-based pointer tracking as set forth in claim 99, wherein in the step of outputting, the user is provided with at least one type of feedback selected from a group consisting of audio feedback, visual feedback, and kinesthetic feedback based on the classification of the object.

102. A method for vision-based pointer tracking as set forth in claim 97, wherein the in the step of outputting, the user is provided with at least one type of feedback selected from a group consisting of audio feedback, visual feedback, and kinesthetic feedback based on the path of the pointer, whereby the method indicates when a path is completed for the recognition process to begin.

103. A method for vision-based pointer tracking as set forth in claim 97, wherein in the step of outputting, the user is provided with at least one type of feedback selected from a group consisting of audio feedback, visual feedback, and kinesthetic feedback based on the classification of the object.

104. A method for vision-based pointer tracking as set forth in claim 81, wherein the step of recognizing the object comprises a step of extracting features from the segmented object, and wherein in the outputting step, the extracted features are outputted.

105. A method for vision-based pointer tracking as set forth in claim 81, wherein the step of robustly predicting the position of the pointer is performed by a Robust Tracking Filter based on state-space estimation.

106. A method for vision-based pointer tracking as set forth in claim 105, wherein the step of recognizing the pointer is tailored for recognizing a finger of a user, whereby the color segmenting step operates on the search window to find finger-colored portions of the search window, and the shape identifying step filters the finger-colored portions of the search window in order to find the finger.

107. A method for vision-based pointer tracking as set forth in claim 105, wherein the step of recognizing the pointer performs a combination of a color segmenting step and a shape identifying step, whereby the color segmenting step operates on the search window to determine the presence of pointer candidates, and the shape identifying step filters the pointer candidates to recognize the pointer within the search window.

108. A method for vision-based pointer tracking as set forth in claim 107, wherein the color segmenting step performs an algorithm selected from a group consisting of a mean shift theorem algorithm used to adaptively quantize a color space to reduce the number of colors; a Gaussian mixture modeling algorithm; a thresholding algorithm used to limit the number of colors to a set designated apriori; and a Markov-random field algorithm.

109. A method for vision-based pointer tracking as set forth in claim 108, wherein the step of recognizing the pointer is tailored for recognizing a finger of a user, whereby the color segmenter operates on the search window to find finger-colored portions of the search window, and the shape identifier filters the finger-colored portions of the search window in order to find the finger.

110. A method for vision-based pointer tracking as set forth in claim 109, wherein the search window has a size and a shape, and wherein the step of adjusting the search window adjusts size and shape of the search window based on historical pointer movements.

111. A method for vision-based pointer tracking as set forth in claim 109, wherein the step of adjusting the search window within the next frame centers a search window of predetermined size on the predicted position of the pointer.

112. A method for vision-based pointer tracking as set forth in claim 111, wherein further comprising a step of determining the size of the search window as a function of the uncertainty in the motion of the pointer.

113. A method for vision-based pointer tracking as set forth in claim 112, where when a pointer is not recognized in the search window, a step of redefining the search window is performed, redefining the search window to encompass the entire image frame so that recognition may be attempted again in a larger area.

114. A computer program product for vision-based pointer tracking, the computer program product comprising means, stored on a computer readable medium, for:
receiving a series of image frames from a camera;
searching a search window within the frame for a portion of the window indicative of a pointer;
recognizing the pointer;
determining the position and trajectory of the pointer;
robustly predicting the position of the pointer in the next image frame in the series of image frames;
adjusting the search window within the next image frame such that the search window comprises a subset of the next image frame positioned so that the actual position of the pointer is likely to be within the search window in the next image frame;
tracking the path of the pointer through an area represented by the series of image frames; and
outputting the path of the pointer, whereby the means for robustly predicting the position of the pointer, combined with the adjusted search window enables the tracking of the path of a pointer in a computationally efficient manner.

115. A computer program product for vision-based pointer tracking as set forth in claim 114, wherein the means for recognizing the pointer is a combination color segmenter and shape identifier, whereby the color segmenter operates on the search window to determine the presence of pointer candidates, and the shape identifier filters the pointer candidates to recognize the pointer within the search window.

116. A computer program product for vision-based pointer tracking as set forth in claim 115, wherein the means for recognizing the pointer is tailored for recognizing a finger of a user, whereby the color segmenter operates on the search window to find finger-colored portions of the search window, and the shape identifier filters the finger-colored portions of the search window in order to find the finger.

117. A computer program product for vision-based pointer tracking as set forth in claim 115, wherein the color segmenter selected from a group consisting of a mean shift theorem algorithm used to adaptively quantize a color space to reduce the number of colors; a Gaussian mixture modeling algorithm; a algorithm used to limit the number of colors to a set designated apriori; and a Markov-random field algorithm.

118. A computer program product for vision-based pointer tracking as set forth in claim 117, wherein the means for recognizing the pointer is tailored for recognizing a finger of a user, whereby the color segmenter operates on the search window to find finger-colored portions of the search window, and the shape identifier filters the finger-colored portions of the search window in order to find the finger.

119. A computer program product for vision-based pointer tracking as set forth in claim 114, wherein the means for robustly predicting the position of the pointer is an algorithm selected from a group consisting of Kalman filters, Extended Kalman filters, and Particle filters and adapted to accommodate uncertainty.

120. A computer program product for vision-based pointer tracking as set forth in claim 114, wherein the means for adjusting the search window within the next frame centers a search window of predetermined size on the predicted position of the pointer.

121. A computer program product for vision-based pointer tracking as set forth in claim 120, wherein the size of the search window is determined as a function of the uncertainty in the motion of the pointer.

122. A computer program product for vision-based pointer tracking as set forth in claim 114, wherein the search window has a size and a shape, and wherein the means for adjusting the search window adjusts size and shape of the search window based on historical pointer movements.

123. A computer program product for vision-based pointer tracking as set forth in claim 114, where when a pointer is not recognized in the search window, the search window is redefined to encompass the entire image frame so that recognition may be attempted again in a larger area.

124. A computer program product for vision-based pointer tracking as set forth in claim 114, wherein the means for robustly predicting the position of the pointer is a Robust Tracking Filter.

125. A computer program product for vision-based pointer tracking as set forth in claim 124, wherein the computer program product further comprises a color segmenter and a shape identifier, wherein the means for recognizing the pointer is tailored for recognizing a finger of a user, whereby the color segmenter operates on the search window to find finger-colored portions of the search window, and the shape identifier filters the finger-colored portions of the search window in order to find the finger.

126. A computer program product for vision-based pointer tracking as set forth in claim 124, wherein the means for recognizing the pointer is a combination color segmenter and shape identifier, whereby the color segmenter operates on the search window to determine the presence of pointer candidates, and the shape identifier filters the pointer candidates to recognize the pointer within the search window.

127. A computer program product for vision-based pointer tracking as set forth in claim 126, wherein the color segmenter selected from a group consisting of a mean shift theorem algorithm used to adaptively quantize a color space to reduce the number of colors; a Gaussian mixture modeling algorithm; a thresholding algorithm used to limit the number of colors to a set designated apriori; and a Markov-random field algorithm.

128. A computer program product for vision-based pointer tracking as set forth in claim 127, wherein the means for recognizing the pointer is tailored for recognizing a finger of a user, whereby the color segmenter operates on the search window to find finger-colored portions of the search window, and the shape identifier filters the finger-colored portions of the search window in order to find the finger.

129. A computer program product for vision-based pointer tracking as set forth in claim 128, wherein the search window has a size and a shape, and wherein the means for adjusting the search window adjusts size and shape of the search window based on historical pointer movements.

130. A computer program product for vision-based pointer tracking as set forth in claim 129, wherein the means for adjusting the search window within the next frame centers a search window of predetermined size on the predicted position of the pointer.

131. A computer program product for vision-based pointer tracking as set forth in claim 130, wherein the size of the search window is determined as a function of the uncertainty in the motion of the pointer.

132. A computer program product for vision-based pointer tracking as set forth in claim 131, where when a pointer is not recognized in the search window, the search window is redefined to encompass the entire image frame so that recognition may be attempted again in a larger area.

133. A computer program product for vision-based pointer tracking as set forth in claim 114, wherein the output is configured to provide the path of the pointer to an object recognizer system residing in the processor and memory, with the object recognizer comprising means for:
    segmenting an object indicated by the path of the pointer; and
    recognizing the object, whereby the pointer may be used to indicate an area in which an object to be recognized resides, and the system can then segment and recognize the object from a scene.

134. A computer program product for vision-based pointer tracking as set forth in claim 133, wherein the means for recognizing the object comprises means for:
    extracting features from the segmented object; and
    classifying the object based on the extracted features to generate an object classification.

135. A computer program product for vision-based pointer tracking as set forth in claim 134, wherein the means for outputting is configured to output the object classification.

136. A computer program product for vision-based pointer tracking as set forth in claim 135, wherein means for outputting is configured to connect with a database system, so that the object classification is communicated with the database system, and wherein a means for inputting is configured to connect with the database system to receive supplementary information regarding the classified object; whereby once an object is classified, information regarding its classification is sent to a database in order to retrieve stored information regarding the object.

137. A computer program product for vision-based pointer tracking as set forth in claim 136, wherein the means for outputting is configured to provide the user with at least one type of feedback selected from a group consisting of audio feedback, visual feedback, and kinesthetic feedback based on the path of the pointer, whereby the system can indicate when a path is completed for the recognition process to begin.

138. A computer program product for vision-based pointer tracking as set forth in claim 136, wherein the means for outputting is configured to provide the user with at least one type of feedback selected from a group consisting of audio feedback, visual feedback, and kinesthetic feedback based on the classification of the object.

139. A computer program product for vision-based pointer tracking as set forth in claim 134, wherein the means for outputting is configured to provide the user with at least one type of feedback selected from a group consisting of audio feedback, visual feedback, and kinesthetic feedback based on the path of the pointer, whereby the system can indicate when a path is completed for the recognition process to begin.

140. A computer program product for vision-based pointer tracking as set forth in claim 134, wherein the means for outputting is configured to provide the user with at least one type of feedback selected from a group consisting of audio feedback, visual feedback, and kinesthetic feedback based on the classification of the object.

141. A computer program product for vision-based pointer tracking as set forth in claim 134, wherein the computer program product further comprises a database, and wherein the classification of the object may be communicated with the database and the database, in turn, may recall supplementary information regarding the object.

142. A computer program product for vision-based pointer tracking as set forth in claim 141, wherein the means for outputting is configured to provide the user with at least one type of feedback selected from a group consisting of audio feedback, visual feedback, and kinesthetic feedback based on the path of the pointer, whereby the system can indicate when a path is completed for the recognition process to begin.

143. A computer program product for vision-based pointer tracking as set forth in claim 141, wherein the means for outputting is configured to provide the user with at least one type of feedback selected from a group consisting of audio feedback, visual feedback, and kinesthetic feedback based on the classification of the object.

144. A computer program product for vision-based pointer tracking as set forth in claim 134, wherein the means for extracting features from the segmented object is selected from a group consisting of a combination of factor analyzing algorithms and an EM algorithm, a color histogram matching algorithm, a wavelet algorithm, a DCT coefficient algorithm, a texture-based algorithm, and an edge-based algorithm.

145. A computer program product for vision-based pointer tracking as set forth in claim 144, wherein the means for classifying the object based on the extracted features is selected from a group consisting of a K-nearest neighbor algorithm, a neural network, and a support vector machine.

146. A computer program product for vision-based pointer tracking as set forth in claim 145, wherein the means for outputting is configured to output the object classification.

147. A computer program product for vision-based pointer tracking as set forth in claim 146, wherein means for outputting is configured to connect with a database system, so that the object classification is communicated with the database system, and wherein a means for inputting is configured to connect with the database system to receive supplementary information regarding the classified object; whereby once an object is classified, information regarding its classification is sent to a database in order to retrieve stored information regarding the object.

148. A computer program product for vision-based pointer tracking as set forth in claim 147, wherein the means for outputting is configured to provide the user with at least one type of feedback selected from a group consisting of audio feedback, visual feedback, and kinesthetic feedback based on the path of the pointer, whereby the system can indicate when a path is completed for the recognition process to begin.

149. A computer program product for vision-based pointer tracking as set forth in claim 147, wherein the means for outputting is configured to provide the user with at least one type of feedback selected from a group consisting of audio feedback, visual feedback, and kinesthetic feedback based on the classification of the object.

150. A computer program product for vision-based pointer tracking as set forth in claim 145, wherein the means for outputting is configured to provide the user with at least one type of feedback selected from a group consisting of audio feedback, visual feedback, and kinesthetic feedback based on the path of the pointer, whereby the system can indicate when a path is completed for the recognition process to begin.

151. A computer program product for vision-based pointer tracking as set forth in claim 145, wherein the means for outputting is configured to provide the user with at least one type of feedback selected from a group consisting of audio feedback, visual feedback, and kinesthetic feedback based on the classification of the object.

152. A computer program product for vision-based pointer tracking as set forth in claim 145, wherein the computer program product further comprises a database, and wherein the classification of the object may be communicated with the database and the database, in turn, may recall supplementary information regarding the object.

153. A computer program product for vision-based pointer tracking as set forth in claim 152, wherein the means for outputting is configured to provide the user with at least one type of feedback selected from a group consisting of audio feedback, visual feedback, and kinesthetic feedback based on the path of the pointer, whereby the system can indicate when a path is completed for the recognition process to begin.

154. A computer program product for vision-based pointer tracking as set forth in claim 152, wherein the means for outputting is configured to provide the user with at least one type of feedback selected from a group consisting of audio feedback, visual feedback, and kinesthetic feedback based on the classification of the object.

155. A computer program product for vision-based pointer tracking as set forth in claim 134, wherein the means for classifying the object based on the extracted features is selected from a group consisting of a K-nearest neighbor algorithm, a neural network, and a support vector machine.

156. A computer program product for vision-based pointer tracking as set forth in claim 155, wherein the means for outputting is configured to output the object classification.

157. A computer program product for vision-based pointer tracking as set forth in claim 156, wherein means for outputting is configured to connect with a database system, so that the object classification is communicated with the database system, and wherein a means for inputting is configured to connect with the database system to receive supplementary information regarding the classified object; whereby once an object is classified, information regarding its classification is sent to a database in order to retrieve stored information regarding the object.

158. A computer program product for vision-based pointer tracking as set forth in claim 157, wherein the means for outputting is configured to provide the user with at least one type of feedback selected from a group consisting of audio feedback, visual feedback, and kinesthetic feedback based on the path of the pointer, whereby the system can indicate when a path is completed for the recognition process to begin.

159. A computer program product for vision-based pointer tracking as set forth in claim 157, wherein the means for outputting is configured to provide the user with at least one type of feedback selected from a group consisting of audio feedback, visual feedback, and kinesthetic feedback based on the classification of the object.

160. A computer program product for vision-based pointer tracking as set forth in claim 155, wherein the means for outputting is configured to provide the user with at least one type of feedback selected from a group consisting of audio feedback, visual feedback, and kinesthetic feedback based on the path of the pointer, whereby the system can indicate when a path is completed for the recognition process to begin.

161. A computer program product for vision-based pointer tracking as set forth in claim 155, wherein the means for outputting is configured to provide the user with at least one type of feedback selected from a group consisting of audio feedback, visual feedback, and kinesthetic feedback based on the classification of the object.

162. A computer program product for vision-based pointer tracking as set forth in claim 155, wherein the computer program product further comprises a database, and wherein the classification of the object may be communicated with the database and the database, in turn, may recall supplementary information regarding the object.

163. A computer program product for vision-based pointer tracking as set forth in claim 162, wherein the means for outputting is configured to provide the user with at least one type of feedback selected from a group consisting of audio feedback, visual feedback, and kinesthetic feedback based on the path of the pointer, whereby the system can indicate when a path is completed for the recognition process to begin.

164. A computer program product for vision-based pointer tracking as set forth in claim 162, wherein the means for outputting is configured to provide the user with at least one type of feedback selected from a group consisting of audio feedback, visual feedback, and kinesthetic feedback based on the classification of the object.

165. A computer program product for vision-based pointer tracking as set forth in claim 133, wherein the means for recognizing the object comprises a means for extracting features from the segmented object, and wherein the means for outputting is configured to output the extracted features.

166. A computer program product for vision-based pointer tracking as set forth in claim 133, wherein the means for robustly predicting the position of the pointer is a Robust Tracking Filter.

167. A computer program product for vision-based pointer tracking as set forth in claim 166, wherein the means for recognizing the pointer is tailored for recognizing a finger of a user, whereby the color segmenter operates on the search window to find finger-colored portions of the search window, and the shape identifier filters the finger-colored portions of the search window in order to find the finger.

168. A computer program product for vision-based pointer tracking as set forth in claim 166, wherein the means for recognizing the pointer is a combination color segmenter and shape identifier, whereby the color segmenter operates on the search window to determine the presence of pointer candidates, and the shape identifier filters the pointer candidates to recognize the pointer within the search window.

169. A computer program product for vision-based pointer tracking as set forth in claim 168, wherein the color segmenter selected from a group consisting of a mean shift theorem algorithm used to adaptively quantize a color space to reduce the number of colors; a Gaussian mixture modeling algorithm; a thresholding algorithm used to limit the number of colors to a set designated apriori; and a Markov-random field algorithm.

170. A computer program product for vision-based pointer tracking as set forth in claim 169, wherein the means for recognizing the pointer is tailored for recognizing a finger of a user, whereby the color segmenter operates on the search window to find finger-colored portions of the search window, and the shape identifier filters the finger-colored portions of the search window in order to find the finger.

171. A computer program product for vision-based pointer tracking as set forth in claim 170, wherein the search window has a size and a shape, and wherein the means for adjusting the search window adjusts size and shape of the search window based on historical pointer movements.

172. A computer program product for vision-based pointer tracking as set forth in claim 170, wherein the means for adjusting the search window within the next frame centers a search window of predetermined size on the predicted position of the pointer.

173. A computer program product for vision-based pointer tracking as set forth in claim 172, wherein the size of the search window is determined as a function of the uncertainty in the motion of the pointer.

174. A computer program product for vision-based pointer tracking as set forth in claim 173, where when a pointer is not recognized in the search window, the search window is redefined to encompass the entire image frame so that recognition may be attempted again in a larger area.

* * * * *

UNITED STATES PATENT AND TRADEMARK OFFICE
CERTIFICATE OF CORRECTION

| | | |
|---|---|---|
| PATENT NO. | : 7,148,913 B2 | Page 1 of 1 |
| APPLICATION NO. | : 10/269797 | |
| DATED | : December 12, 2006 | |
| INVENTOR(S) | : Patricia Keaton et al. | |

It is certified that error appears in the above-identified patent and that said Letters Patent is hereby corrected as shown below:

There is a subscript error and an exponent error in the second half of the equation at column 14, line 33, "$\hat{F}_i = (F - \hat{\lambda}_i \hat{G}_i \hat{Q}_i E_g^T E_f)(I - \hat{\lambda}_{iPi\backslash i} E_f^E E_f)$"

Should read:

--$\hat{F}_i = (F - \hat{\lambda}_i \hat{G}_i \hat{Q}_i E_g^T E_f)(I - \hat{\lambda}_i \hat{P}_{i\backslash i} E_f^T E_f)$--

Signed and Sealed this

Thirteenth Day of May, 2008

JON W. DUDAS
*Director of the United States Patent and Trademark Office*